US012529658B2

(12) United States Patent
Alam et al.

(10) Patent No.: US 12,529,658 B2
(45) Date of Patent: Jan. 20, 2026

(54) DIAMOND AND COLORLESS GEMSTONE MULTI-TESTER

(71) Applicant: Smart Pro Instrument Co., Ltd., Samut Sakhon (TH)

(72) Inventors: Mehboob Alam, Bangkok (TH); Raweerat Homyamyen Montilla, Samut Sakhon (TH); Absalon James Montilla, Samut Sakhon (TH)

(73) Assignee: Smart Pro Instrument Co., Ltd. (TH)

(*) Notice: Subject to any disclaimer, the term of this patent is extended or adjusted under 35 U.S.C. 154(b) by 183 days.

(21) Appl. No.: 18/077,963

(22) Filed: Dec. 8, 2022

(65) Prior Publication Data

US 2024/0027358 A1    Jan. 25, 2024

Related U.S. Application Data

(60) Provisional application No. 63/390,686, filed on Jul. 20, 2022.

(51) Int. Cl.
*G01N 21/33* (2006.01)
*G01N 21/87* (2006.01)

(52) U.S. Cl.
CPC ............ *G01N 21/87* (2013.01); *G01N 21/33* (2013.01); *G01N 2201/062* (2013.01)

(58) Field of Classification Search
CPC ........ G01N 21/87; G01N 21/88; G01N 25/18; G01N 21/33; G01N 2201/062

(Continued)

(56) References Cited

U.S. PATENT DOCUMENTS

| 5,835,205 A | * | 11/1998 | Hunter | ............. G01N 21/87 356/30 |
| 5,955,735 A |   | 9/1999  | Coleman |  |

(Continued)

FOREIGN PATENT DOCUMENTS

CH          639490 A5 * 11/1983      ............. G01N 25/18

OTHER PUBLICATIONS

PCT/IB23/00396, International Search Report & Written Opinion, mailed Oct. 12, 2023.

(Continued)

*Primary Examiner* — Michelle M Iacoletti
*Assistant Examiner* — Maher Yazback
(74) *Attorney, Agent, or Firm* — Aldo Noto, Esq.; Rimon PC

(57) ABSTRACT

Hand-held, rechargeable multi-tester with 2 in 1 thermal and optical LED probe tip, for identifying Earth-mined diamond, Type IIa HPHT diamonds, Type IIa CVD diamond, Simulant and Moissanite (including F1). All-in-one testing probe having both thermal conductivity sensor and optical sensor. Testing probe uses copper tube with built-in optical fiber for the tip of the probe and bundled optical fibers forming an optical ring to illuminate a target stone with light source using internal UV LEDs. Short and long wave UV light can be used singularly or together. Sensors measure thermal conductivity and optical absorptivity by converting an amount of temperature change and incident light into an output and sending signals to microcontroller unit to give results using color LCD touch screen to display and with speaking results in multiple languages. In addition to thermal and short and long wave optical, testing for metal may be added to handheld tester.

20 Claims, 15 Drawing Sheets

(58) Field of Classification Search
USPC .......................................................... 356/30
See application file for complete search history.

(56) References Cited

U.S. PATENT DOCUMENTS

| | | | | |
|---|---|---|---|---|
| 6,043,742 | A * | 3/2000 | Austin | G01N 33/389 |
| | | | | 702/155 |
| 6,265,884 | B1 * | 7/2001 | Menashi | G01N 27/041 |
| | | | | 324/717 |
| 9,176,068 | B1 * | 11/2015 | Radomyshelsky | G01J 3/2803 |
| 2006/0066859 | A1 * | 3/2006 | Downey | G01N 21/431 |
| | | | | 356/445 |
| 2006/0087306 | A1 | 4/2006 | Loginov | |
| 2006/0152731 | A1 * | 7/2006 | Maentele | G01N 21/645 |
| | | | | 356/306 |
| 2012/0007619 | A1 | 1/2012 | Zhu et al. | |
| 2014/0337035 | A1 | 11/2014 | Kessler et al. | |
| 2015/0233740 | A1 | 8/2015 | Yeo et al. | |
| 2016/0161420 | A1 | 6/2016 | Zhu et al. | |
| 2016/0161705 | A1 | 6/2016 | Marquardt | |
| 2018/0172599 | A1 * | 6/2018 | Wang | G01N 21/87 |
| 2020/0110040 | A1 | 4/2020 | Zhu et al. | |
| 2020/0217803 | A1 * | 7/2020 | Tam | G01N 21/59 |
| 2020/0400646 | A1 | 12/2020 | Tam | |
| 2022/0120695 | A1 | 4/2022 | Zhu et al. | |
| 2023/0129963 | A1 * | 4/2023 | Shibuya | G01N 21/64 |
| | | | | 702/183 |
| 2024/0060879 | A1 * | 2/2024 | Takahashi | G01N 21/33 |

OTHER PUBLICATIONS

PCT/IB23/00417, International Search Report & Written Opinion, mailed Oct. 12, 2023.
PCT/IB2023000396, extended European search report, issued Oct. 2, 2025.
PCT/IB2023000417, extended European search report, issued Oct. 2, 2025.

* cited by examiner

DIAMOND AND COLORLESS GEMSTONE MULTI-TESTER

I. TECHNICAL FIELD OF THE INVENTION

This invention relates, in general, to testers for the identification of precious diamonds and, in particular, to gem testers for distinguishing colorless gemstone such as Diamond, Synthetic diamond CVD/HPHT, Moissanite, Cubic zirconia, Sapphire and Metals based upon physical conductivity properties and optical properties.

II. BACKGROUND

Gemstones such as Cubic Zirconia (CZ)/Glass, white Sapphire, synthetic Moissanites and Natural Diamonds have similar physical properties and are difficult to differentiate by human naked eyes. Many fraudsters in the market mix fake stones with real diamonds to have a bigger profit. To prevent from fraudulent and mistaken sales, an advanced gem tester which can authenticate Natural Diamonds is required. Diamonds have been revered by humans since ancient times mainly as gemstone. Its scarcity, hardness and bright sparkle makes it a status symbol. Apart from being the much sought-after gemstone, the many remarkable properties of diamond have similar appeal to material scientists and engineers. Among the properties are hardest known material, chemical inertness, and highest thermal conductivity at room temperature, least compressible and highest stiffness.

The most common chemical impurity in natural diamond is nitrogen. Natural diamonds have traditionally been classified according to both the concentration and configuration of nitrogen impurities, as monitored by infrared and ultraviolet absorption. Infrared absorption in the one-phonon absorption region (below 1330 cm-1) is forbidden in perfect diamond by crystal symmetry but is allowed by the lower symmetry around impurities or lattice defects. For the most common form of natural diamonds, four classifications of natural diamond have been made on the basis of optical properties.

Type Ia accounts for 95 to 98% of natural diamond and contains substantial nitrogen impurity (up to 0.2%), which forms in aggregates or platelets. This type of diamond has strong absorption below 320 nm, low thermal conductivity «9 W/[m·K]), and high electrical resistivity (>1014 n·m).

Type Ib also has substantial nitrogen but in a dispersed substitutional form. The nitrogen imparts color, ranging from pale yellow to green, depending on nitrogen concentration. Synthetic industrial diamonds are typically Type Ib.

Type IIa is gem-quality diamond essentially free of nitrogen. This type has the highest thermal conductivity (>2000 W/[m·K]), high electrical resistivity (>1014 n·m), and good optical transmission.

Type IIb is also nitrogen-free but contains boron impurity (up to 0.25 ppm in natural diamond and up to 270 ppm in doped synthetic diamond) that results in p-type conductivity (electrical resistivity 0.1 to 100 n·m) and imparts a blue color to the diamond.

In addition to diamond's unique mechanical properties, its thermal properties are also unusual. The strong net bonding results in very low thermal expansion, high acoustic frequencies (and hence a very high Debye temperature of 2220 K), and low room-temperature heat capacity. Even more remarkable is the exceptionally high room-temperature thermal conductivity of diamond, which is more than five times that of metals such as silver or copper. This large thermal conductivity results in high resistance to thermal shock and thermal lensing.

The diamond industry has now entered a critical period when synthetic and treated diamonds are near indistinguishable from earth mined diamonds. High Pressure-High Temperature (HPHT) processes are used to enhance the natural color of earth mined diamonds while Chemical Vapor Deposition (CVD) synthetic diamond are sold without disclosure. These diamonds might be mixed amongst earth mined diamonds and are bought unwittingly. Although the diamond can be sent for lab verification, such action is expensive and excessive in comparison to the value of the stone. Uniquely, diamonds are the only gem material comprised of a single chemical element; pure diamond is made exclusively of carbon. Following the research in the late eighteenth century by Antoine Lavoisier, Smithson Tennant and Humphrey Davy, who, amongst them, first recognized that diamond was simply one of the possible forms of carbon, there followed many attempts to synthesize diamonds in the laboratory from one of the other, less valuable forms of carbon. Some of the researchers who attempted to manufacture diamond concluded that, because natural diamonds were probably produced under geological conditions of high pressure and high temperature (HPHT), such conditions would be necessary to manufacture diamonds in the laboratory. However, it was not until the middle of the twentieth century that the first undisputed synthetic diamonds were produced. The original process for synthetic diamond produced grit-sized particles suitable for industrial applications, but developments of that process now allow HPHT synthetic diamonds weighing a few carats to be grown on a commercial basis. Of far greater concern to the gem trade is the fact, made public in 1999, that the color of some natural diamonds can be enhanced by HPHT processing of natural diamonds. In particular, certain brown diamonds can be converted to near-colorless, or occasionally pink or blue colors. If suitable starting material is available, it is far more lucrative to use HPHT equipment to enhance the color of natural diamonds (which takes only a few minutes) than to tie it up for days growing large synthetic diamonds. Within the last few years, a new method has been developed for producing gem-quality diamond, using chemical vapor deposition (CVD). This does not require high-pressure presses or extremely high temperatures. Instead, a carbon-containing gas is decomposed at a pressure somewhat below atmospheric pressure in an energetic plasma, and the carbon is deposited as diamond.

Development of new CVD diamond growth techniques began in the early 1980s by the Japanese and, by the end of the decade, it became possible to make large structures of high-quality polycrystalline diamond whose mechanical, thermal, and optical properties approach those of Type IIa natural diamonds. A major advantage of the CVD technique is that growth can occur at lower temperature (~1200 K) and very low pressure (2500 Pa). Films are grown on a temperature controlled, heated substrate, such as silicon, metal oxides, or refractory metals, using methane or acetylene (mixed with hydrogen and other gases) as a source of carbon (CH3 is the active radical). Microwaves, hot sparks, hot filaments, or other techniques are used to dissociate the gases partially. The various CVD techniques produce high-quality polycrystalline diamond films. Despite the small numbers of these relatively new forms of diamond, gem testing laboratories will nevertheless be expected to detect such specimens when they turn up. In some cases, a simple visual inspection will suffice, in other cases sophisticated spectroscopic techniques will be required. Once regarded simply as curiosities, during the last decade, colored diamonds have begun to come into fashion, and to create their own market. HPHT synthetic diamonds can be produced in a range of 'fancy' colors, the HPHT processing of natural brown diamonds brings about a dramatic change in the color of the diamond and CVD diamond frequently has a brown color which can be enhanced by HPHT processing. It is therefore vitally important that we have a reasonable understanding of why some diamonds are colored. In fact, the vast majority of natural diamonds are colored, which is why a top-quality near-colorless stone can command such a high selling price.

Cubic zirconia was discovered as a natural mineral in 1937, The zircon contained some tiny crystals which they identified by X-ray diffraction as the cubic form of zirconium oxide (or zirconia), a compound known as baddeleyite when in the monoclinic form. As the name implies, cubic zirconia crystallizes in the cubic (isometric) crystal system. The chemical formula is $ZrO_2$ with minor amounts of certain metallic oxides like calcium oxide (CaO) or yttrium oxide ($Y_2O_3$) that act as structure stabilizing agents in the otherwise naturally monoclinic material. The refractive index of cubic zirconia varies between 2.15 and 2.18 which is somewhat less than diamond's fairly constant 2.42 reading. The slightly lower refractive index is, in general, balanced out by a dispersion of approximately 0.060 which is greater than diamond's dispersion of 0.044. Showing no cleavage and with a hardness of 7½ to 8½ on the Mohs scale, cubic zirconia is a very acceptable synthetic gem material. As a result, it is known to this day by its scientific name, cubic zirconia, and the prefix synthetic, although proper, is not usually included. This same material had already been used for many years as a ceramic composition for high-temperature industrial and scientific purposes; because of an exceptionally high melting point, "stabilized zirconia" ceramics can be used at temperatures up to 2540° C. (4604° F.) and are very resistant to most chemical substances. Such stabilized zirconia typically consists of 96% ZrOs (zirconia) and 4% CaO (lime), although MgO (magnesia) or $Y_2O_3$ (yttria) also can be used in place of the CaO. Distinctions from real Diamond—Several articles in this journal have dealt with various aspects of this problem. The distinction is obvious to the trained, aware eye. In a loose stone, the high specific gravity is readily apparent. Flatness of faces and sharpness of edges are not foolproof criteria, and girdles apparently showing "naturals" have been observed on cubic zirconia. However, the uniquely high thermal conductivity of diamond provides an unambiguous identification of diamond.

The synthetic form of the Silicon Carbide (SiC) moissanite, SiC, has been manufactured for ornamental and gem use in the 1960s some iridescent, though opaque, crystal groups were around at gem and mineral shows, but it was only in recent years that a transparent variety was able to be synthesized, the manufacturer being located in North Carolina, USA. Most of the properties of a diamond are quite well imitated and the usual anxiety associated with new diamond imitations was reported to be pervading the trade. Such reports are usually exaggerated the properties of moissanite may be detected easily by a gemmologist with simple equipment. Synthetic moissanite belong to the hexagonal crystal system and show birefringence absent from diamonds. Near-parallel needles and stringers may be seen at right angles to the table. Some specimens show rounded facet edges (those of diamond are exceptionally sharp) which are not in themselves a vital clue. There are also some uni-directional polishing lines on adjacent facets, which do not occur on a diamond. Gemological properties are: hardness 9.25, RI 2.648-2.691 with a birefringence of 0.043, uniaxial positive and dispersion 0.104, which is more than twice as great as diamond. The SG is 3.22 (diamond is 3.52). These properties can all be tested with a little effort but with any diamond imitation it is usually worth devising a catch-all detector. Reflectivity meters have usually been used to separate diamond-like transparent stones from their more serious imitators YAG and CZ though they can only reach a few stones in a piece of jewelry which contains many small ones in hard-to-reach places. These lurking "diamonds" can more often be reached with the thermal conductivity tester which will very effectively separate diamonds from most of its simulants.

Synthetic moissanite is a semiconductor material like diamond; the main differences in chemical composition in both materials involve only very small amounts of nitrogen and boron that can substitute in the crystal. This situation is quite different from cubic zirconia, where variable amounts of stabilizers, and even different stabilizers, lead to considerable variation in composition, and hence, to broad ranges in its properties. Synthetic moissanite is reportedly stable in air to 1700° C. (3092° F.); in vacuum to 2000° C.; and is inert to well over 1000° C. to most chemicals, except fluorine, chlorine, molten alkalis, and some molten metals (Divakar et al., 1993). In view of this high stability in air, even in situ soldering of broken prongs, as is done with diamond jewelry, should present no problem when synthetic moissanite is used in a mounting. In fact, the small synthetic moissanites in a ring can be cast in place, a practice used in manufacturing. However, it may exhibit slightly less brilliance; it has more dispersion, a lower S.G., and a higher R.I.; and it is less hard and non-isotropic. Nevertheless, diamond and synthetic moissanite have overlapping thermal inertia ranges, because of that, they both react as "diamond" with a thermal probe.

A thermal conductivity tester will give a 'diamond' reading for synthetic moissanite in any case so that its use may be confined to separating diamond and synthetic moissanite from other diamond simulants: a further test to separate the two would be magnification. However, in the same way that many gemstones have similar or overlapping SG and reflectivity values, there are many stones with similar or overlapping thermal conductivity values. The use of this type of instrument is therefore limited to the identification of only a relatively small selection of stones, and to providing guidance in the case of very small mounted stoned that cannot be tested on more conventional equipment.

III. SUMMARY OF THE INVENTION

The apparatus precious stone Multi-Tester that permits one to positively identify a target precious polished stone such as a Natural Diamond, CVD/HPHT, Moissanite, Sapphire and Cubic zirconia of various shapes and sizes, Colorless to faint (D-M), loose or mounted in jewelry. The result will display on a screen such as an LCD colored touch screen for user friendly interfacing and convenience in operating the tester device. Also, the tester may be equipped with a speaking output in multiple languages. The portable housing comprises a handheld casing with rechargeable battery.

One advantage of the invention is that it provides multi-functional testing all in just a one test probe. The test probe is designed for the very first special technique of Thermal and Optical testing in one test probe tip. The 2-in-1 test probe performs both optical (both short wave UV and long wave UV) and thermal sensing in a single probe device. In one example of a 2-in-1 test probe, there is a copper tube for thermal conductivity with a thermal measurement unit, as well as, built-in the center of the tube, at least one optical fiber for optical testing. An ultraviolet LED light source, which emits specific short and/or specific long wavelengths of light, which are transmitted through the fibers to a ring light surrounding the copper tube to illuminate the target gemstone. The emitted light reflects back up through the table and crown and travels into the probes optical fiber which is connected to the photodetector units. The photodetector units convert the light energy from the fiber to electrical energy which is then analyzed by the microcontroller unit. The microcontroller unit controls the processing and provides multi-function capability. The results of the tester will show on the display and the tester is also able to send data via a wireless communication link such as Bluetooth for mobile application in order to show, record and/or generate the test result into a certificate for the end user.

Another advantage is that the multi-tester includes a metal detector.

Another advantage of the invention is that the multi-functional testing, all in one test probe, is designed to perform electrical conductivity, thermal conductivity and optical testing all in one probe. The optical testing may be either or both short wave UV light and long wave UV light reflection.

In one embodiment, an apparatus for testing and identifying precious stones and man-made stones based on their thermal and optical properties is described, the apparatus comprising:
 a handheld case;
 a probe connected to the handheld case comprising an outer copper tube and at least one optical fiber positioned within the copper tube, wherein a tip of the probe makes contact with a table facet of a stone under test and the at least one optical fiber receives light reflected from the stone under test;
 a heating element, wherein the copper tube is heated by the heating element;
 a thermistor operably connected to the copper tube, wherein the temperature of the copper tube is sensed;
 an ultraviolet LED source producing short and long wavelength UV light;
 an optical fiber bundle, optically connected to the LED source and surrounding at least a portion of the copper tube, wherein the optical fiber bundle illuminates the stone under test with the short and long wavelength UV light;
 an optical detector, connected to the at least one optical fiber, wherein the received light of the at least one optical fiber is measured;
 a microcontroller, operably connected to the thermistor and optical detector, configured to determine optical properties and thermal properties of the stone under test; and
 a display unit, attached to the handheld case, wherein results of the stone under test are displayed.

In another embodiment of the apparatus, the optical fiber bundle surrounds the copper tube towards the tip of the probe and emits light toward the stone under test.

In another embodiment of the apparatus, the optical fiber bundle and the copper tube are encased in a housing.

In another embodiment of the apparatus, the microcontroller is configured to identify the stone under test wherein the stone under test is one of an earth-mined diamond, a Type IIa HPHT diamond, a Type IIa CVD diamond, a Simulant and a Moissanite.

In another embodiment of the apparatus, the apparatus is further configured to test for metal using a conductive hand grip and the probe, wherein the apparatus examines for a closed electrical circuit to indicate electrical conductivity of the item under test indicating metal is present.

In another embodiment of the apparatus, it further comprises an optical window between the at least one optical fiber and the optical detector.

In another embodiment of the apparatus, the display unit includes a touch screen display panel for use by a user.

In another embodiment of the apparatus, it further comprises a speaker for audio output of information to the user.

In another embodiment of the apparatus is configured for a user selecting a language for audio output on the speaker.

In another embodiment of the apparatus, the display unit further comprises software for selecting a display screen language from several languages.

In another embodiment of the apparatus, the optical detector is an Si—C photodiode with extended wavelength for optical measurements in the ultraviolet range, both short and long wavelength measurements.

In another embodiment of the apparatus, the LED light source comprises a surface mounted device (SMD) package. In yet another, the SMD package emits ultra-violet short wavelength between 250 nm and 275 nm and ultra-violet long wavelength between 350 nm and 375 nm.

In another embodiment of the apparatus, it further comprises a Bluetooth transceiver wherein the apparatus is adapted to communicate with a smartphone or a tablet via Bluetooth.

In another embodiment of the apparatus, the thermal conductivity properties and the optical properties of the stone under test are determined at the same time by the microcontroller. In other embodiments, the thermal conductivity properties are determined first followed by the optical properties. In other embodiments, a metal test is conducted first followed by a thermal conductivity test and then if necessary an optical properties test.

In another embodiment, the apparatus comprises two wires soldered to the copper tube for use in thermal conductivity testing, for example, one soldered on either side of the shrinkable tube.

One embodiment is a method for testing and identifying precious stones and man-made stones based on their thermal and optical properties using a handheld testing apparatus, the method comprising:
 heating a metal tube with a heater wherein the heater is connected to the metal tube; sensing the temperature of the metal tube using a thermistor connected to the metal tube;
 placing the heated metal tube in contact with a stone under test;
 calculating, using a microcontroller, the amount of heat transfer from the metal tube to the stone under test;
 determining whether the calculated heat transfer is within certain heat transfer ranges expected of glass, a simulant, or item of greater thermal conductivity, wherein the greater the heat transfer the higher the thermal conductivity of the stone under test;
 turn ultra-violet LED lights on;
 passing the ultra-violet LED light through an optical fiber bundle;

illuminating the stone under test with ultra-violet light using the optical fiber bundle, wherein the stone under test reflects some portion of the ultra-violet light;

receiving ultra-violet light reflected by the stone under test using an optical fiber located inside the metal tube, wherein the optical fiber is in contact with the stone under test;

measuring the amount of ultra-violet light reflected into the optical fiber using an optical detector;

determining, using a microcontroller, based on the amount of reflected ultra-violet light received by the optical fiber, whether the stone under test is in optical property range of a Moissanite, Chemical Vapour Deposition (CVD)/High Pressure High Temperature (HPHT) or diamond; and displaying a result of the determination on type of stone on a visual display.

In another embodiment, the method includes the ultra-violet light being both short and long wavelength ultra-violet light and wherein the short and the long wavelength are each separately measured.

In another embodiment, the method includes sensing of the temperature of the metal tube simultaneously with receiving of the ultra-violet light reflected by the stone. In yet another embodiment, the temperature of the metal tube is measured first.

In another embodiment, the handheld apparatus includes a hand grip that conducts electricity, the method further comprises the step of electrical conductivity testing using the metal tube wherein it is determined whether there is metal in contact with the metal tube.

In another embodiment of a method, if the calculated heat transfer falls within the ranges expected for glass or a simulant, then the ultraviolet lights are not turned on or activated.

Other features and advantages of the present invention will become apparent from the following more detailed description, taken in conjunction with the accompanying drawings which illustrate, by way of example, the principles of the invention.

IV. BRIEF DESCRIPTION OF THE DRAWINGS

The accompanying drawings illustrate the invention. In such drawings.

V. DETAILED DESCRIPTION OF THE INVENTION

Introduction

Figure 1A:
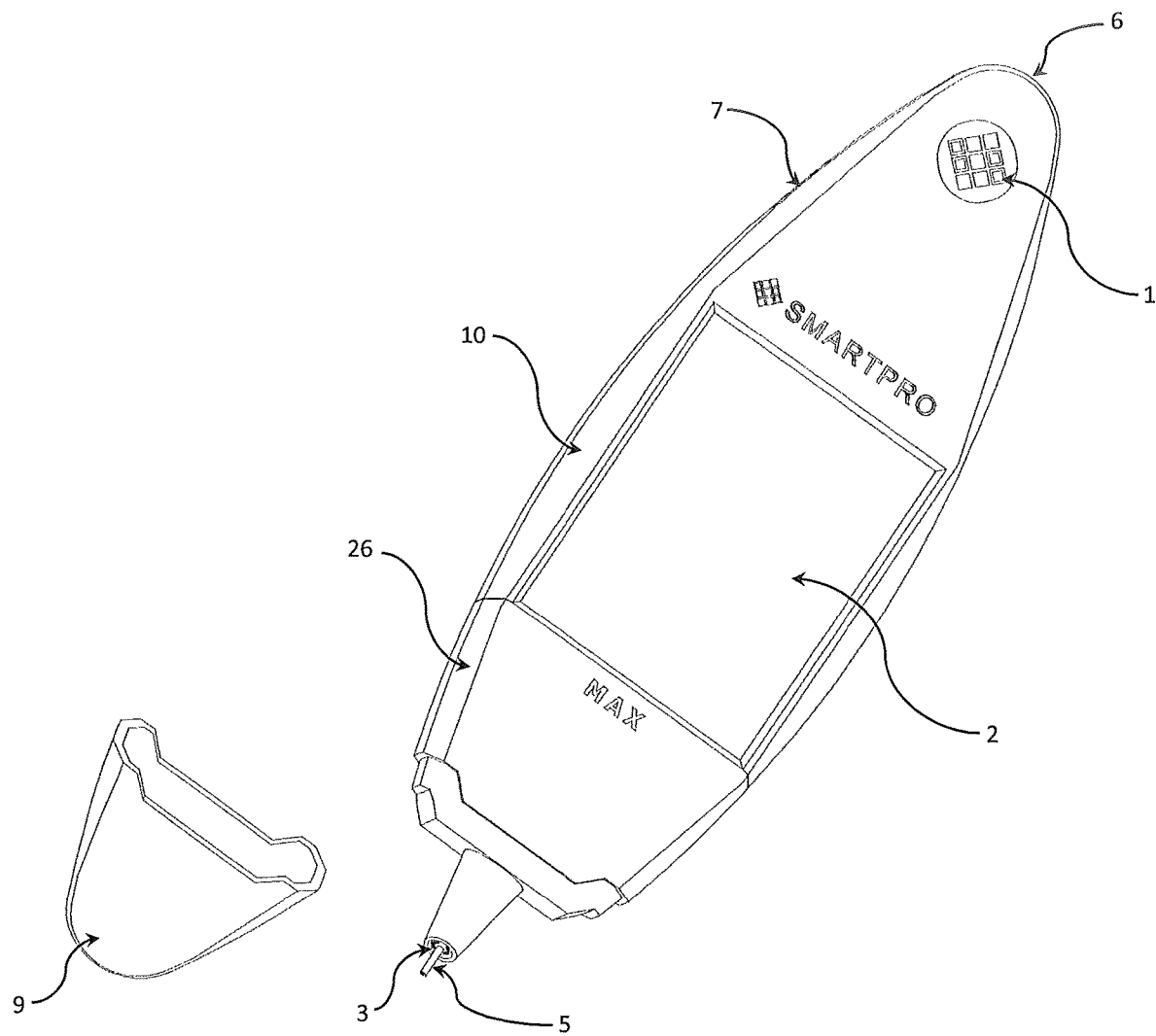
FIG. 1A is the introductory figure of the apparatus appearance.

While there are a number of methods to measure the thermal conductivity of a gemstone, one method used to sense the thermal conductivity of gemstones in narrow ranges is quite effective. When the temperature of the probe tip starts to fall on contact with a gemstone, it first reaches a preset temperature level at which a timer circuit is turned on. At a second lower preset temperature the timer is turned off, and the comparative thermal conductivity of the gemstone is displayed digitally as a time interval between the two temperature levels. The greater the thermal conductivity of the stone, the shorter is this time interval and the smaller the readout number.

The light absorption spectra of most diamonds may be divided into two main groups. Diamonds of the Cape series, which fluoresce with a blue light, and have a body color varying from colorless to yellow. In this group the strongest absorption line is at 415 nm, varying in strength with the depth of the body color and often noted in colorless specimens. Associated with it are lines at 478 nm (often the only one visible), 465, 452, 435 and 423 nm. Diamonds in the second group have a brown, greenish yellow or green body color and show a green response to UV Absorptions include a strong narrow line at 503 nm with weak lines at 537 and 495 nm. Blue and green fluorescing crystals may also show the 415 nm line. Some colorless, bright yellow and brownish yellow diamonds, with a yellow fluorescent glow under UV, may show no discrete bands at room temperature except for, maybe, a weak line at 415 nm. Blue (type IIb) diamonds absorb slightly in the red which is difficult to observe with the hand spectroscope. Fluorescence is often seen to be banded or sectorized. Under long-wave ultraviolet light (LWUV) the response may be blue, green or yellow, sometimes a reddish glow. The strength of the response varies from weak to a strong sky-blue. Fluorescence response is the basis of a number of methods for recording individual diamonds so that they can be traced in the event of loss. Diamonds fluorescing a bright blue do invariably, however, show yellow phosphorescence varying in strength with the strength of the blue glow. This combination has been recorded only in diamonds. Some pink diamonds show an orange fluorescence with persistent orange phosphorescence. The spectroscope will show a bright line at 575 nm weaker bands at 586, 598 and 618 nm. The bright line at 575 nm is sometimes accompanied by an additional bright line at 537 nm. These bands have been reported from diamonds colored by atomic bombardment. Under short-wave ultra-violet light (SWUV) the fluorescent effects are in general similar to those observed in LW but the response is markedly weaker. Under X-rays most diamonds show a rather uniform bluish white glow; the exceptions are those diamonds which show a yellow glow under UV and show a similar glow under X-rays but this is not always so. Some diamonds were more transparent to UV than others. This was made the basis of a classification of diamonds into two types—type I and type II. Type I diamonds are transparent down to about 300 nm while type II are much more transparent and pass UV down to about 225 nm. Type II diamonds are subdivided into type IIa and type IIb. The type IIa are said not to phosphoresce when irradiated with SWUV, while the type IIb when similarly irradiated shows a bluish phosphorescence and will also conduct electricity. In the type IIb diamonds sometimes the afterglow is red, and this is so with the famous Hope blue diamond. The electrical effects shown by type IIb diamonds are due to the presence of boron atoms. The reason for the difference in the absorption of UV is due to free nitrogen in type I diamonds, and this type has been divided into two sections: type Ia in which the nitrogen has been shown to be in groups of two or more atoms, and type Ib in which the nitrogen is dispersed in substitutional sites in a paramagnetic form. Any nitrogen in type II diamonds is in extremely low concentrations. There is some evidence that well-formed diamond crystals depend to some extent on the presence of nitrogen; and, further, it is noticeable that large diamonds which are found do not show any good crystal form and are almost surely type II diamonds.

For identification purposes, an important single item of information about a gemstone is its refractive index. The reason for this is that the refractive index (RI) of most gemstones is a constant which can be measured with precision to four significant figures (i.e. to three decimal places). Because of this precision and constancy, most gems can be distinguished with ease even when their RIs differ only very slightly (e.g. natural and synthetic spinel; pink topaz and tourmaline). The refractive index of a material is a measure of the degree by which it bends or refracts light rays passing through it. When a ray of light passes from one medium (such as air) in to another medium of greater optical density (such as a gemstone), the ray is refracted, or bent, towards the normal (i.e. towards an imaginary line drawn at right-angles to the surface. The greater the difference in the optical densities of the two media, the greater will be the amount of refraction of light passing through them. As the velocity of light is decreased in an optically dense material (and is inversely proportional to the optical density), the RI of the material can also be expressed as the ratio of the velocity of light in air to the velocity of light in the medium. Two laws of reflection are form the framework necessary for basic optics:

1. The angle of incidence of a light ray striking a flat reflecting surface is equal to its angle of reflection.
2. The incident ray, the reflected ray and the normal (at the point of incidence) all lie in the same plane.

When light enters a transparent material that has a density that is different from the medium in which it is traveling, its speed changes. Light passing from a less dense medium (e.g. air) to a more dense medium (e.g. gem) is slowed down. Conversely, going from a more dense to less dense medium light speeds up. The refractive index (R.I.) of a substance is the speed of light within a substance compared to the speed of light in air. For comparison purposes we take the speed of light in air to be equal to 1. Defined in this way, refractive index can be stated as:

RI=velocity of light in air (=1)
velocity of light in gem follows from this definition that light in a gem with an R.I. of 2 travels at exactly half its speed in air (2=1/(½)). It also follows that light will travel faster in gems with a low R.I. than in gems with a high R.I.

The Critical Angle and Total Reflection, Brilliance in gemstones reflects primarily how light exits the gem. Light leaving a gemstone either; escapes and is refracted away from the normal or; is completely reflected back into the stone. The most brilliant gemstones are those whose pavilion facets (bottom of the stone) act like mirrors, reflecting light back up through the table and crown (top of stone) to the eye. Gemstones whose pavilion facets behave as windows, passing light out the bottom of the stone, look dull and less brilliant. The angle at which it strikes the facet and the R.I. of the gemstone. Recall that light leaving a gem will be refracted away from the normal, and the amount of refraction depends on the angle at which it strikes the surface and the R.I. Light striking a facet perpendicular to the facet will escape without being refracted, whereas light striking the facet at a somewhat lower angle will bend away from the normal as it exits It should be apparent that there must exist some angle of incidence at which light striking a facet on its way out will be bent far enough to emerge along a path that is exactly parallel to the facet. This angle is a unique property in every transparent mineral and is called the critical angle (C.A.). It is related to the refractive index by the simple relation:

$$\text{Sine } C.A. = \frac{1}{RI}$$

Light striking a facet at an angle greater than the critical angle cannot escape through the facet but is instead reflected back into the gem. The equations states that minerals with high R.I.s (e.g. diamond) have low C.A.s and vice-versa.

Critical angle is defined, like the angles of incidence and refraction, with respect to a normal. For quartz, which has a critical angle of 40.2°, all rays of light exiting facets at this angle to the normal are refracted parallel to the facet they strike. Rays of exiting light striking facets at angles greater than this angle are internally reflected, and bounce around the interior of the stone until they impinge upon a facet at less 40.2° to the normal, where they then escape. In order to simplify this concept somewhat we could imagine a cone with an opening angle equal to the critical angle of the gem that is centered on a normal to a facet. These cones are referred to as cones of acceptance. All light rays in the gem striking the facet at angles within the cone will escape out the facet, and all light rays striking the facet outside the cone will be reflected off the facet and stay within the gemstone. Gems with a higher R.I.s have smaller cones of acceptance, and thus can internally reflect greater amounts of light than gems with lower R.I.s (larger cones of acceptance). This is the conceptual reason why gemstones of high R.I. materials are more brilliant than those made of materials with a low R.I., all other factors being equal. Because gemstones gather light from all angles, there will always be lots of light that will pass through the stone without being internally reflected. Indeed, to try to evaluate all possible ray paths for incoming and exiting light in even the simplest cuts is a daunting if not impossible task. Cuts can be designed by simple, graphical ray tracing of near-vertically incident light entering the table or crown of the stone, and by experimentation, to internally reflect the maximum amount of light back up to the table and crown facets. This is because a large percentage of light striking facets at angles much less than 90° is reflected from the facet surfaces, never makes it into the stone and thus does not contribute to the brilliance. Although such ray tracing exercises greatly oversimplify the true nature of a cuts brilliance, they reveal certain aspects that lead to several important generalizations that can be applied to all cuts.

Diamonds are one of the hardest materials. They are three dimensional stones of carbon atoms held together by a strong covalent bond; they are and isotope carbon. Diamonds are also one of the easiest mediums for light to travel through due to their transparency, which enhances the amount of light that travels through it. The reason diamonds "shine" and are seen to be "lit up" by the human eye is due to Total Internal Reflection (TIR) as well as a process called dispersion. Terms such as brilliance, fire and scintillation are also commonly used to describe the light emitted from a diamond. Likewise, the angle of light, where it enters the diamond, and the shape of the diamond changes the way the ray of light travels which will be described further on. Another factor that changes the way a diamond plays with rays of light rather than any other media is due to its refractive index. A diamond has a very high index of refraction of around 2.42. It is also dispersive, its dispersive value being 0.044. Further, the critical angle of a diamond is actually considered very small, it is around 24.5 degrees. Due to these three aspects, the percentage of incident rays which go through total internal reflection before leaving the diamond is actually significantly larger than any other media. Various straight cuts and polishes of a diamond also ensure maximum internal reflection inside the diamond after the light ray refracts if it is done precisely. Typically, in an ideal diamond, light rays travel through the crown facets and go through 'TIR' twice at the pavilion facets before exiting out the table of the diamond. We can see how these light rays must be perfectly straight for this process to happen, which is why diamonds are polished it ensures the "shine". The tester was built and programmed accounting for these optical properties.

Tester Apparatus

In the following description details describe embodiments of the tester.

Reference is now to FIG. 1A illustrates the introductory figure of the tester device showing its general appearance. It is powered by a power source such as a rechargeable battery and/or USB-C input power. The tester comprises a handheld body 10, a conductive hand grip 26, a toggle switch 1, a touch screen display 2, an optical fiber bundle head 3, an Optical & Thermal tube 5, a USB-C input port 6, Probe tip's casing cover 9 and at the side of the handheld housing or body there are open slots for a speaker 7.

Figure 1B:
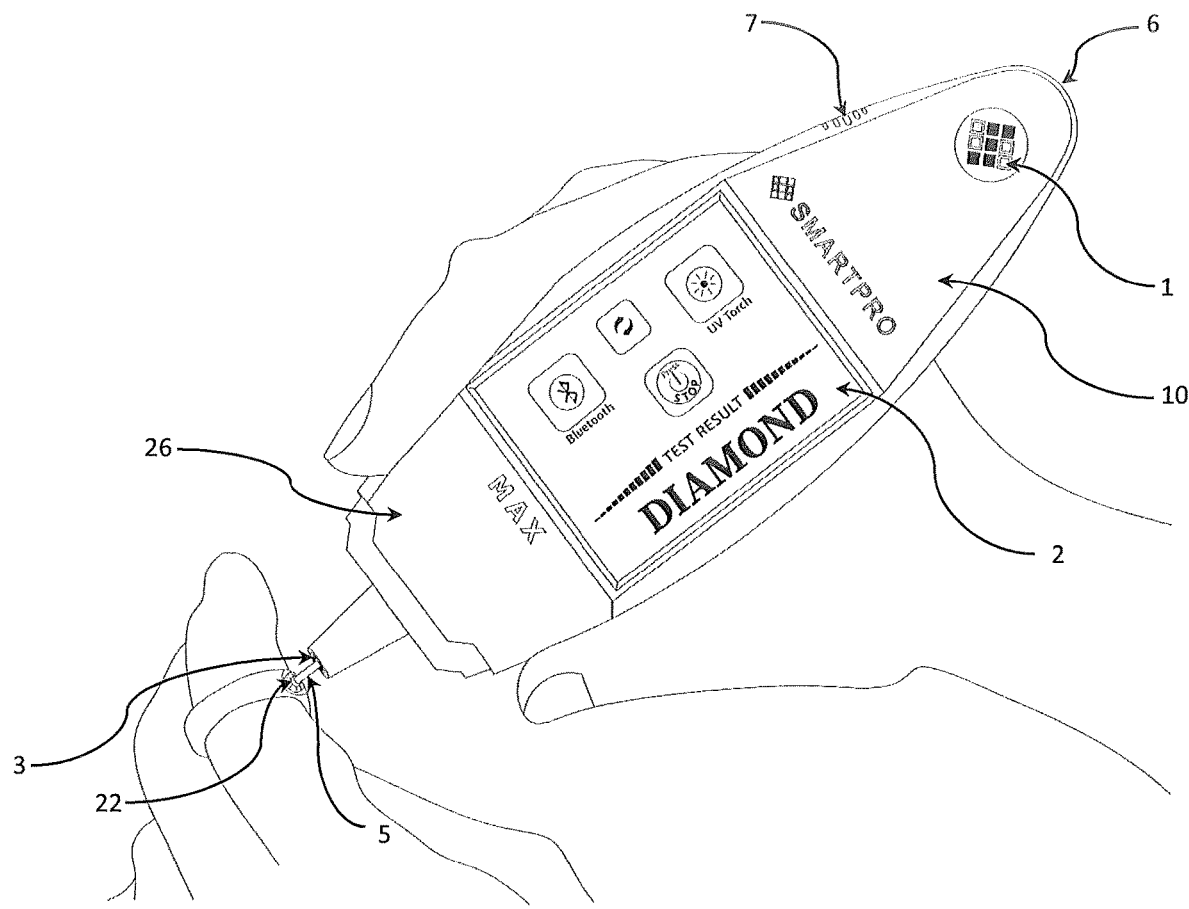
FIG. 1B is a simulation of an actual operation of gemstone testing.

FIG. 1B shows how such an apparatus is used to identify a gemstone. It illustrates the tester held in one hand and another hand is holding the ring having a mounted stone. The test specimen is held in position and the gemstone testing device is positioned in contact with the specimen. In particular, the detector probe 5 can be positioned on a flat surface of the specimen, such as a table facet of the stone 22. The identification is performed by the electronic circuitry of the gemstone testing apparatus. The specimen can be held in position by holding the jewelry in which the stone is mounted or for loose stones using a holder. In any case, the tip of the probe is placed on a table facet of the gemstone 22. The user can operate by touch the functions on LCD display 2. The tester was designed to perform using both thermal conductivity and light absorbance and reflection. In performing the test, the tip of the test probe is held in contact with the table facet of the stone 22 and held perpendicular to the table facet 22. The optical fiber bundle ring 3 will illuminate the stone with light setup to surround the Test probe 5. Again the test probe which is the Thermal & Optical tube 5, is in one embodiment pointing perpendicularly to the table facet 22 of the gemstone in the jewelry.

The probe must be properly positioned with the stone being tested. In some embodiments, spacing between the probe and the stone or, the probe not being placed within the table facet and in good contact with the stone, can lead to inaccurate readings. In one embodiment, the entire face of the probe must be in full contact with the table facet 22 or at least a flat surface of the stone to obtain proper thermal and optical test readings. In other embodiments, the probe must be centered on the stone and in complete contact with a flat surface of the stone, such as the table 22. The probe being angled with the table or positioned out of the area of the table facet may lead to inaccurate readings. Good positioning and contact of the probe on the stone provide better readings.

Figure 2:
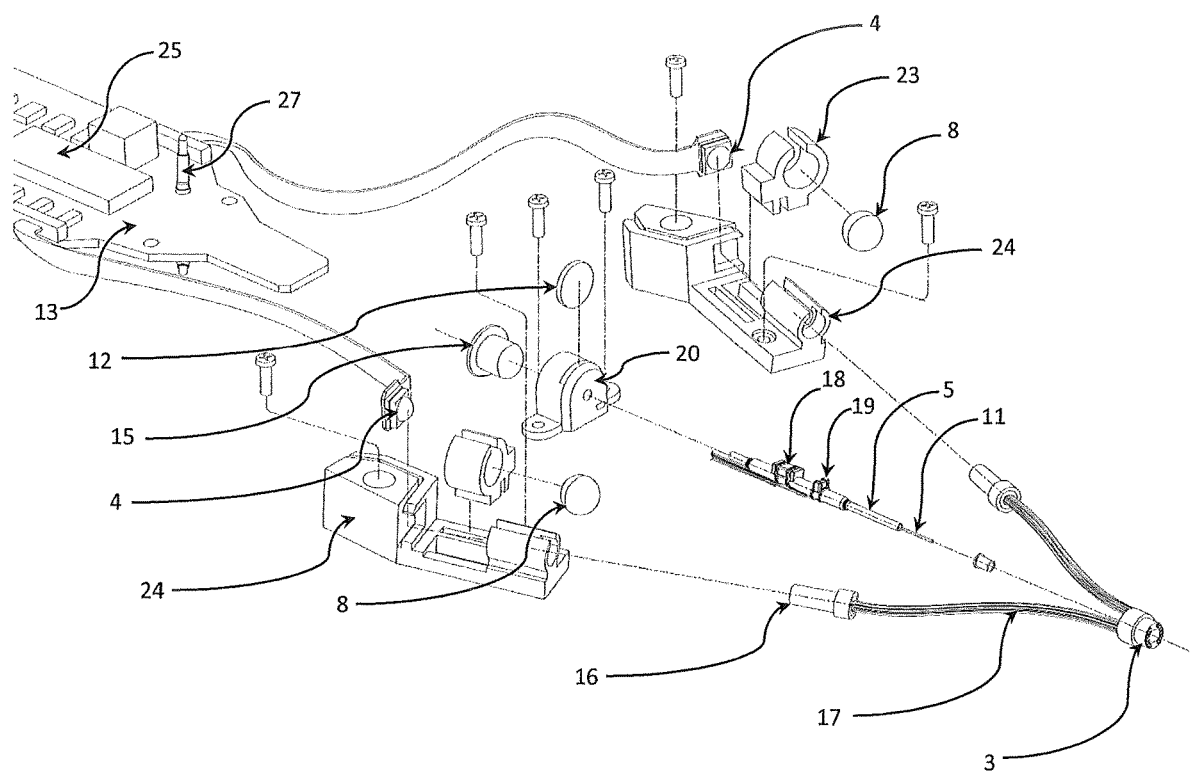
FIG. 2 is a partially exploded perspective view of an apparatus, illustrating without the housing to reveal electronics and mechanical parts.

FIG. 2 illustrates a partially exploded view of an assembled tester including: a Print circuit board (PCB) 13 with assembled electronics parts including a microcontroller unit 25, Metal Detector 27, a Thermal & Optical tube 5, outside the Thermal & Optical probe tube 5 a Negative Temperature Coefficient (NTC) Thermistor 19 and Heating resistor 18, inside the tube a Fiber rod 11 leading to the Optical detector housing 20 which is comprised of an Optical window 12 and an Optical detector 15. The Thermal & Optical tube 5 is assembled into the Optical fiber bundle head 3. The Fiber bundle's legs 16 are assembled into the Housing for fiber bundle's leg and LED 24, next to the Optical lens 8 with the Optical lens holder 23, next to UV LEDs (which in some embodiments are 2-in-1 containing the short-wave ultraviolet lights (SWUV) and long-wave ultraviolet lights (LWUV)) 4.

Figure 3:
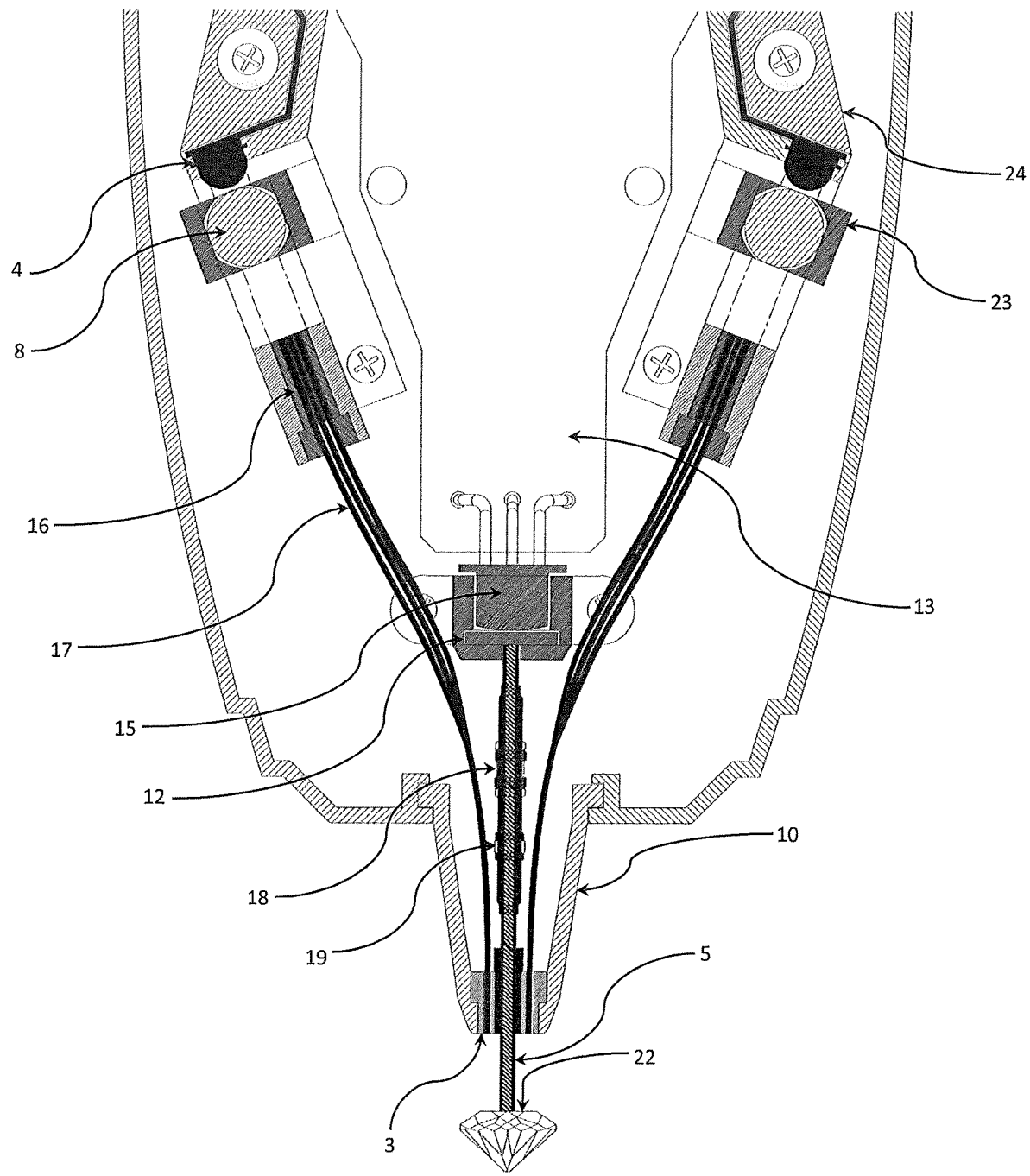
FIG. 3 is a cut-away view showing an assembled section view of Thermal and Optical probe, Lens, LEDs, Sensor and the housing.

FIG. 3 section cut shows the setup of the Thermal & Optical tube 5 when already assembled into the Optical fiber bundle head 3. The Thermal & Optical tube 5 is surrounded by the optical fiber bundle head 3. The test probe 5 is exposed from exiting the housing to the tip that contacts the table facet of gemstone 22. The back end of thermal & optical tube 5 is going into the Optical detector housing 20 and contact to the Optical window 12 which has the Optical detector 15 set behind it. FIG. 3 also shows the optical parts arranged within the handheld housing 10, including the optical fibers from the Optical fiber bundle 17 separated into two groups towards their destination which are lighting units housing 23 and 24 contain with the optical components for signal coupling between the LED and Optical fiber. The set of LED light units 4 are arranged or grouped in a concentric or circular fashion.

Figure 4:
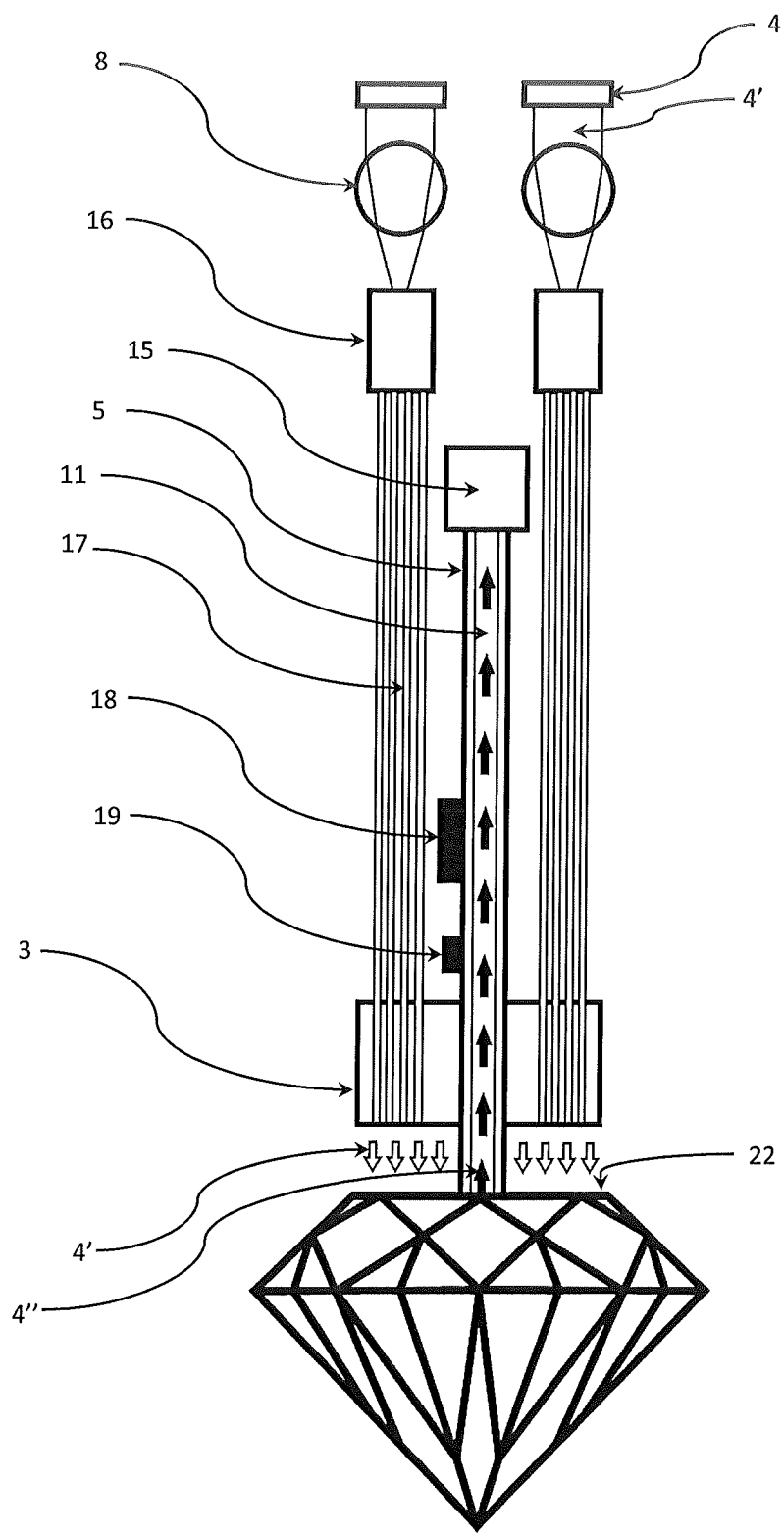
FIG. 4 shows working method architecture.

FIG. 4 shows the architecture of the tester for thermal and optical testing. A heater 18 and a NTC 19 are mounted onto the test probe 5. In one embodiment, the heater 18 is made from loops of heating wire of known resistance. Heaters should give a constant/time-invariant heat output accounting for the fact that the resistance of a heating wire changes with temperature. An inconsistent power output is expected if a constant current is applied. The changing of a specimen stone's temperature under test is detected by the electronic circuits. If the probe tip is surrounded by air or held in contact with a poor thermal conductor such as a Simulant, the tip temperature remains high. If the probe tip is held in contact with a Moissanite or CVD/HPHT or Earth-mined diamond, the heat energy is conducted away rapidly and the temperature of the copper tube 5 falls. In one method of thermal conductivity testing, the amount of time it takes for a predetermined temperature fall is used to test for thermal conductivity. In other methods, for example, the resistance to a rise in temperature may be used.

In some embodiments optical testing begins after thermal testing. For optical testing first light is emitted from the UV LEDs 4 that emit long & short wavelength light when current flows through them. When coupling the light from LEDs 4 into each Fiber bundle's legs 16, the UV radiation is coupled by an optical lens 8. In one embodiment, the optical lens 8 is a ball lens. The choice of a ball lens 8 is dependent on the Numerical Aperture (NA) of the fiber and the diameter of the input source which is LED light beam 4'. The diameter of the LED light beam 4' is used to determine the NA of the ball lens. The NA of the ball lens must be less than or equal to the NA of the fiber optic fiber in order to couple all of the light. The ball lens is placed at its back focal length from the fiber.

There are parameters needed to understand and use ball lenses: Diameter of Input Source (d), Diameter of Ball Lens (D), Effective Focal Length of Ball Lens (EFL), Back Focal Length of Ball Lens (BFL) and Index of Refraction of Ball Lens (n).

EFL is measured from the center of the ball lens, $$EFL = \frac{nD}{4(n-1)}$$

BFL can be calculated once EFL and D are known, $$BFL = EFL - \frac{D}{2}$$

The numerical aperture (NA) is dependent of focal length of the ball, $$NA = \frac{2d(n-1)}{nD}$$

The ball lens allows light to travel between the source (LED 4) and fibers with minimal losses. When the light travels to the optical fiber bundle head 3, light is output and illuminates the test gemstone. How much optical transmission and absorption of the incident ray depends on the tested stone. The light reflection methods used with the tester allow for many different gems and gems on various types of jewelry to be optically examined. When the tip of the test probe 5 is placed on the table facet of gemstone 22, light 4' is emitted from optical fiber bundle head 3 and passes into the gemstone. In the gemstone, there will be an internal reflection back from the cut of the gemstone 4". The reflected lights 4" travels through fiber rod 11 inside the test Probe 5 going to the Optical detector 15. In one embodiment, the Optical detector 15 is a SiC-photodiode with extended wavelength range for optical measurements in the UV-range. The optical detector 15 is located to receive the light from the end of test probe 5 and converts photons (or light) into electrical current.

Figure 5:
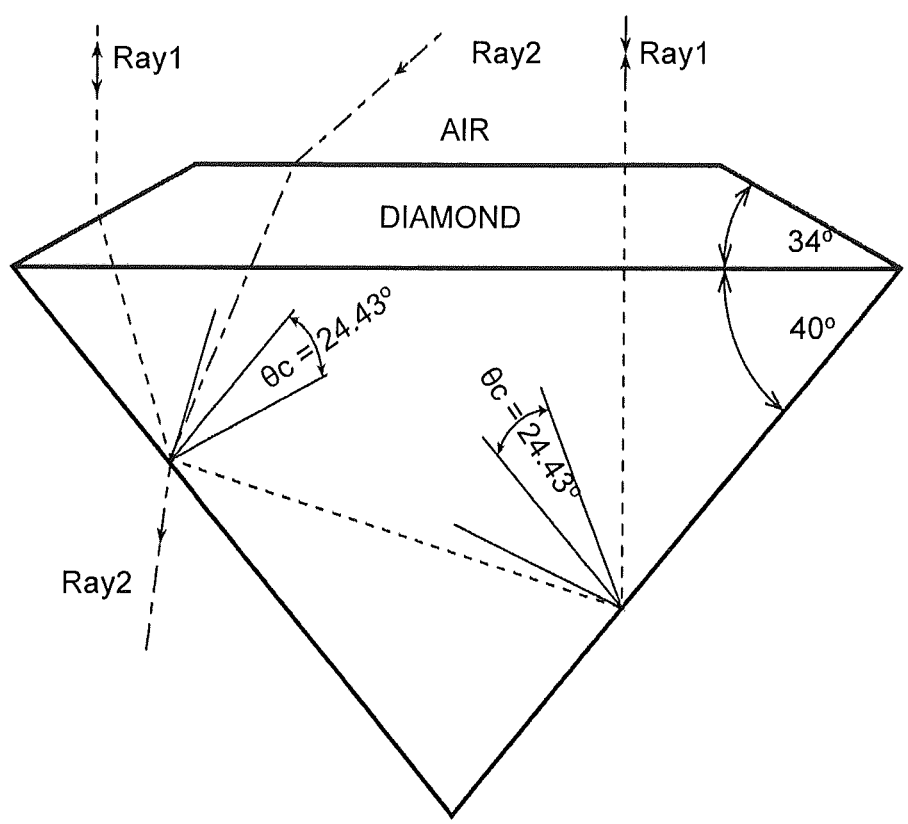
FIG. 5 shows the critical angles of cut diamond.

FIG. 5 shows the total internal reflection of ray 1, which meets the pavilion facets of diamond at an angle greater than the critical angle. Ray 2 meets the pavilion facets at an angle less than the critical angle and is refracted out of the pavilion. Light rays are reflected back from a gemstone facet at angles to the normal which are greater than the critical angle and are refracted out of the gemstone at angles less than the critical angle. For a transparent faceted gemstone is to have a bright and sparkling appearance, it is important that as many of the rays as possible entering the gem through its crown facets are reflected from the pavilion facets, and re-emerge from the stone as a result of total internal reflection. To achieve this condition, the lapidary or diamond polisher must adjust the angles of the crown and pavilion facets so that the majority of rays entering the crown facets meet the interior faces of the pavilion facets at angles to the normal which are greater than the critical angle of the stone. If the angles are wrong, the rays will pass out through the pavilion facets, and the stone will appear dark. It is also important that the rays reflected back from the pavilion facets meet the crown facets at angles less than the critical angle. If they fail to do this, they will be reflected back into the stone again. The critical angle of reflection of a gemstone is dependent on both the Refractive Index (RI) of the gemstone and that of the surrounding medium, as shown in the following equation:

$$\text{Sine of critical angle} = \frac{RI \text{ of surrounding medium}}{RI \text{ of gemstone}}$$

If the surrounding medium is air $$\text{Sine of critical angle} = \frac{1}{RI \text{ of gemstone}}$$

$$\text{Critical Angle} = \text{Arc sine } \frac{1}{RI \text{ of gemstone}}$$

To determine the critical angle of a gem material in air, its RI value is simply inverted (i.e. divided into 1.0), and this value is taken as the sine of the critical angle. The angle itself can then be derived from a set of trigonometric tables. For diamond, with an RI of 2.417, $$\text{Sine of critical angle} = \frac{1}{2.417} = 0.413$$

$$\text{Critical Angle} = \text{Arc sine } 0.413 = 24.43°$$

From this it can be seen that for maximum brilliance, that the pavilion/girdle angle is important. In FIG. 5, a single (ray1) is shown undergoing total internal reflection in a diamond (in either direction). A second (ray2) is shown entering the diamond's table facet at a shallow angle and being refracted out through the back of the stone via the 'cone' formed by the critical angle. Thus, showing the importance of the critical angle in the design of a gemstone's profile. Ray path diagrams that take into account all of the rays entering the crown facets are much more complicated. Because of the complexity of such diagrams, computer programs have been developed to plot them, and these provide a means of rapidly determining how a gem's brilliance is affected by small variations in its crown and pavilion facet angles.

Figure 6A:
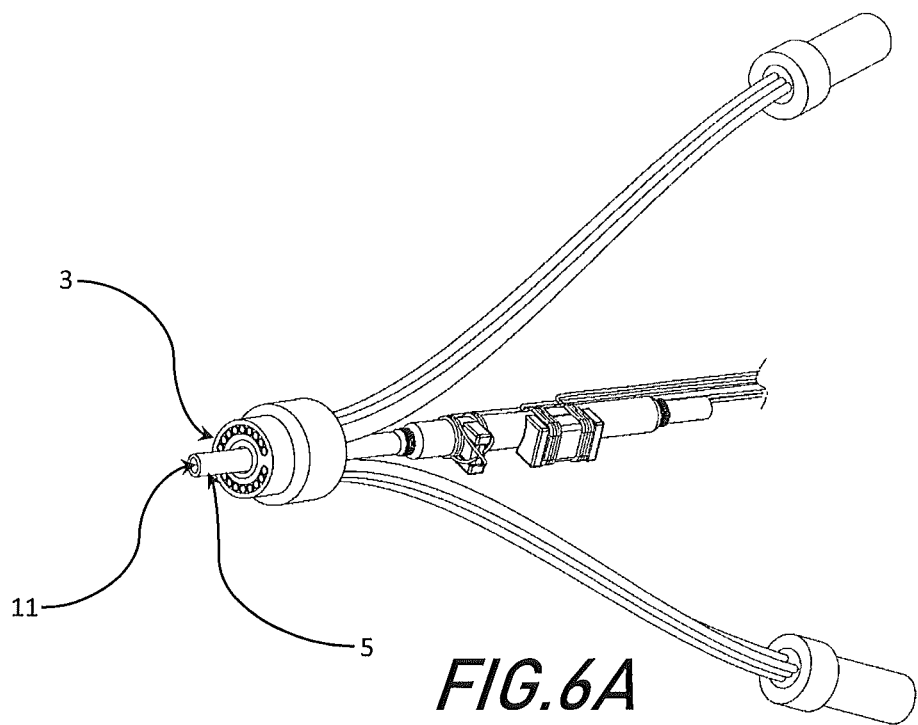
FIG. 6A is a perspective front view showing an example of the design of the Thermal and Optical probe.
Figure 6B:
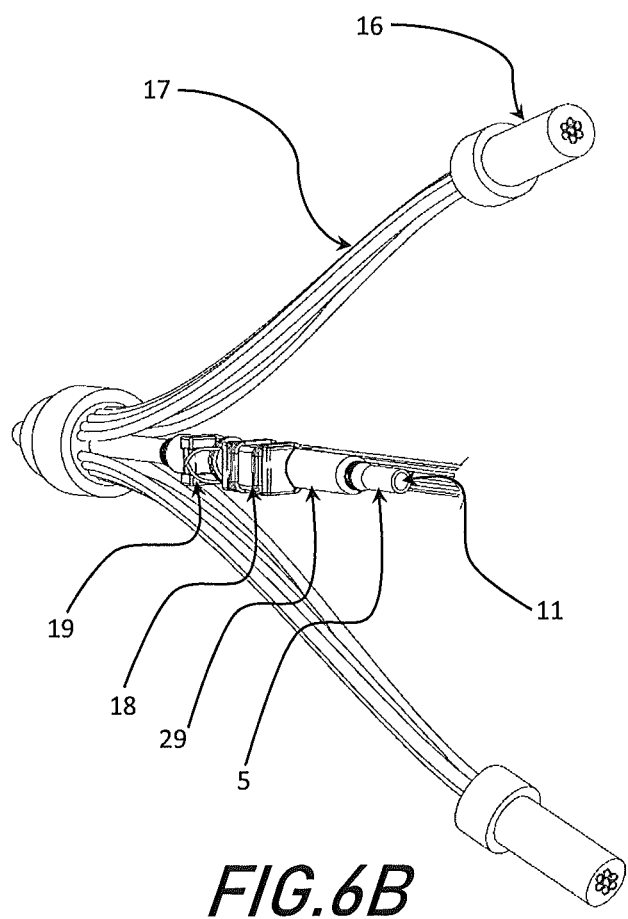
FIG. 6B is a perspective back view showing an example of the design of the Thermal and Optical probe.

FIG. 6A and FIG. 6B are the architecture of the unique testing equipment. The test probe 5 which provides both thermal and optical testing, is shown with a metal tube which is made from copper in some embodiments. Various types of metal may be used for the tube, preferably those metals with high thermal conductivity. The metal tube has a heater in the form of a heating resistor 18 mounted on it, a Negative Temperature Coefficient (NTC) Thermistor 19, and a fiber rod 11 inserted internally. The test probe is shown assembled into the optical fiber bundle head 3 in concentrically surrounded by an optical fiber bundle 17 has been divided into two groups and leads to a connector at the end of each group 16.

Figure 7A:
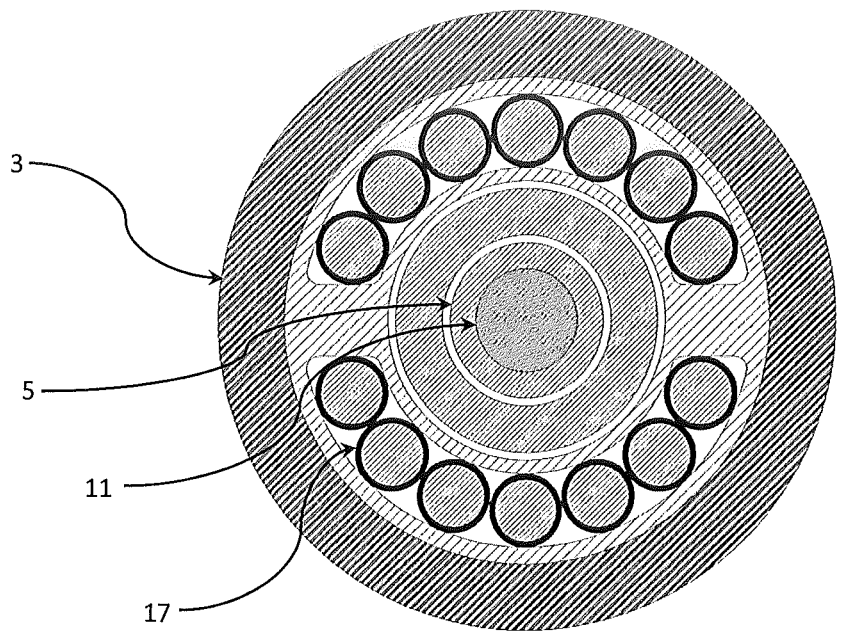
FIG. 7A shows the cross sectional view of the optical portions of the testing apparatus.
Figure 7B:
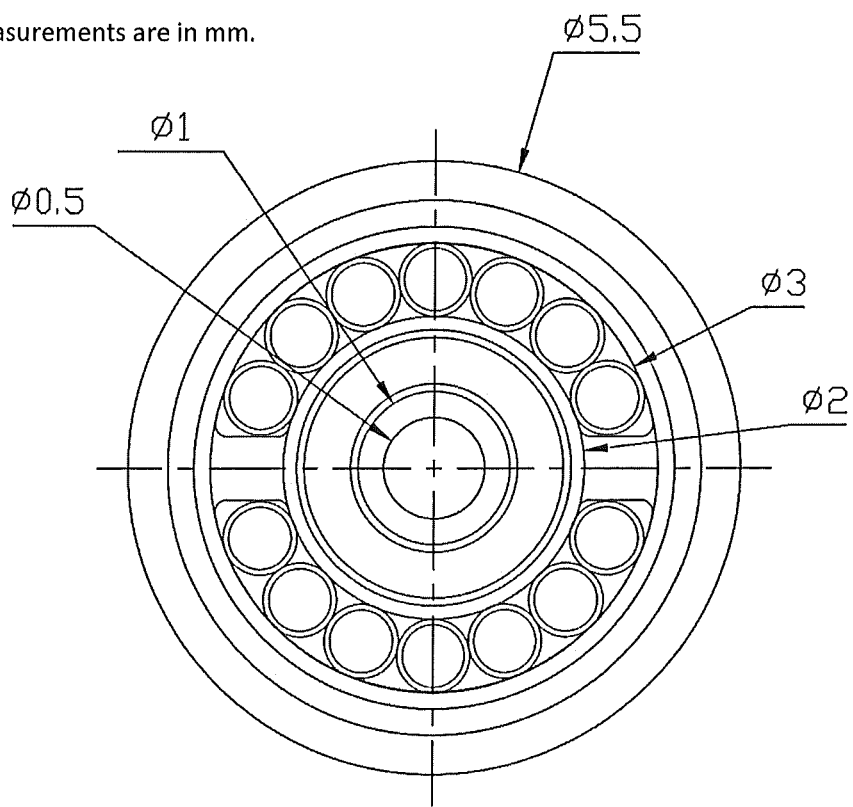
FIG. 7B shows the dimension of cross sectional view of the optical portions of the testing apparatus.

FIG. 7A and FIG. 7B are cross sectional views of the optical fiber bundle head 3 with the fiber optic bundle 17 surrounding the copper tube 5 and internal fiber rod 11. FIG. 7B shows some exemplary measurements for the parts shown including that the diameter of the fiber optic bundle head 3 portion of the tester is approximately 5.5 mm in one example. In the same example, the copper tube portion is about 1.0 mm in diameter with the center hole being about 0.5 mm in diameter. Other approximate exemplary measurements are visible in FIG. 7B.

Figure 8A:
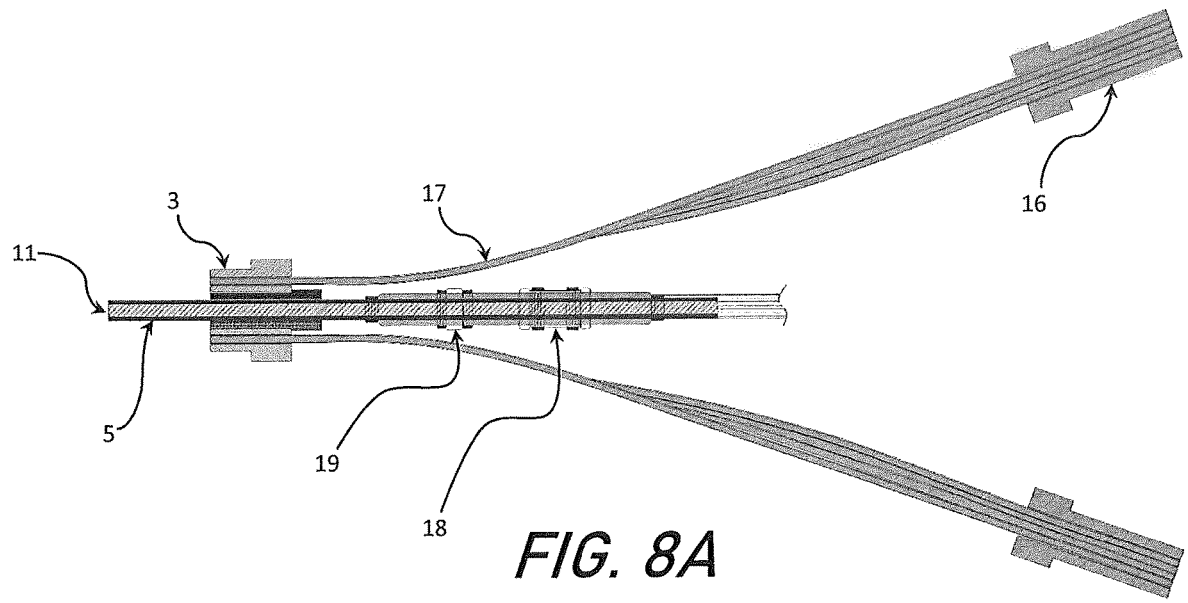
FIG. 8A shows a cross sectional view of Thermal tube with the Optical Fiber bundle head.

FIG. 8A is cross-sectional view of the tip of the probe 5, Optical fiber bundle head 3, a Fiber rod 11, Fiber bundle's legs 16 and Optical fiber bundle 17.

Figure 8B:
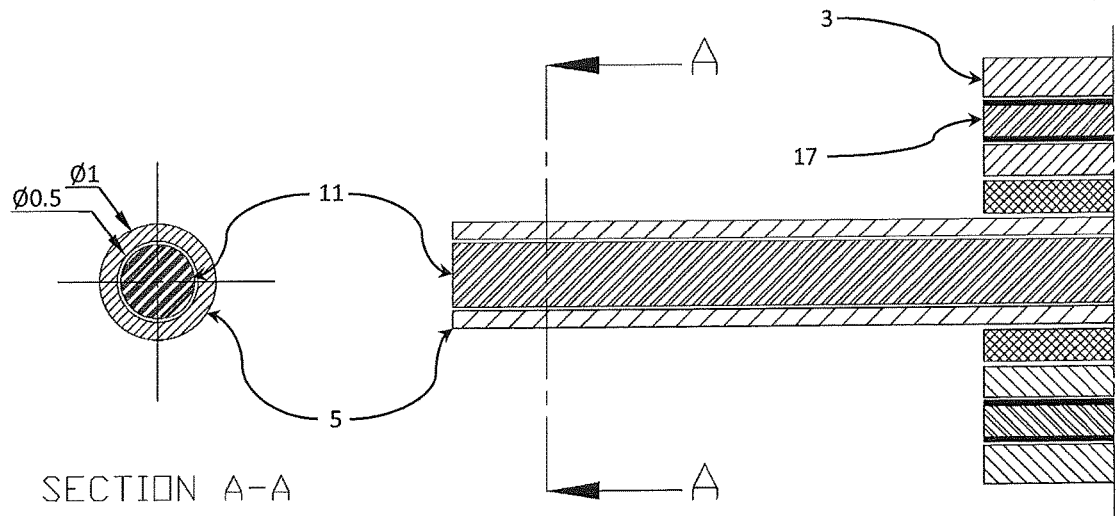
FIG. 8B shows the cross sectional view of the tip of the probe and the optical fiber

FIG. 8B is a cross sectional view of the tip of the probe 5 and the optical fiber head 3.

Figure 8C:
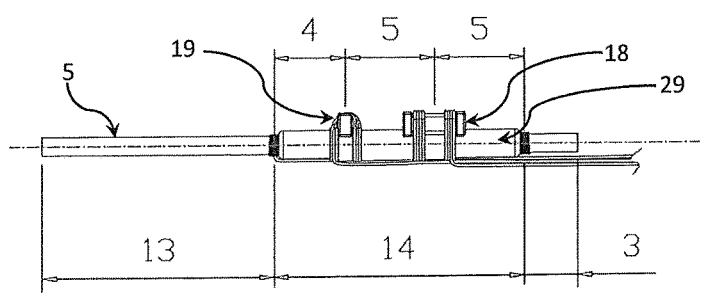
FIG. 8C shows the example of the design of the Thermal probe tube with specific dimension.

FIG. 8C is shows the example of the design of the Thermal probe tube with specific dimension. The copper tube 5 is heated during the start-up of the apparatus (warming-up) and continuously being heated during idle and thermal conductivity testing. The tube 5 should be warming at all times, ready for testing a gemstone. The Resistor heater 18 and NTC Thermistor 19 are attached on the copper tube 5 locked by glue and rolled over by connecting (magnetic) wires to lock in place. A shrinkable tube 29 is used to isolate Heater resistor 18 and Thermistor 19 from copper tube 5 to prevent from short circuit. These parts are connected to MCU 25 to control and monitor the temperature for the stability of the desired temperature. In the thermal conductivity test of the apparatus, the stone's temperature is not being measured but rather the level of heat transfer from the copper probe 5 to the gemstone 25 being test. This is done by measuring the voltage difference of the two wires, one is soldered on the copper tube with 4-5 mm distance from resistor heater 18 and the other wire is soldered near NTC Thermistor 19 at the opposite side of the copper tube 5. In FIG. 8C the two soldered connections are shown at either end of the shrinkable tube 29. The measured voltage difference will be amplified by an operational amplifier circuit 28 and its output is measured by MCU 25. This measurement is used for thermal conductivity testing, measuring the level of heat transfer from the copper probe 5 to the gemstone 22.

Figure 9A:
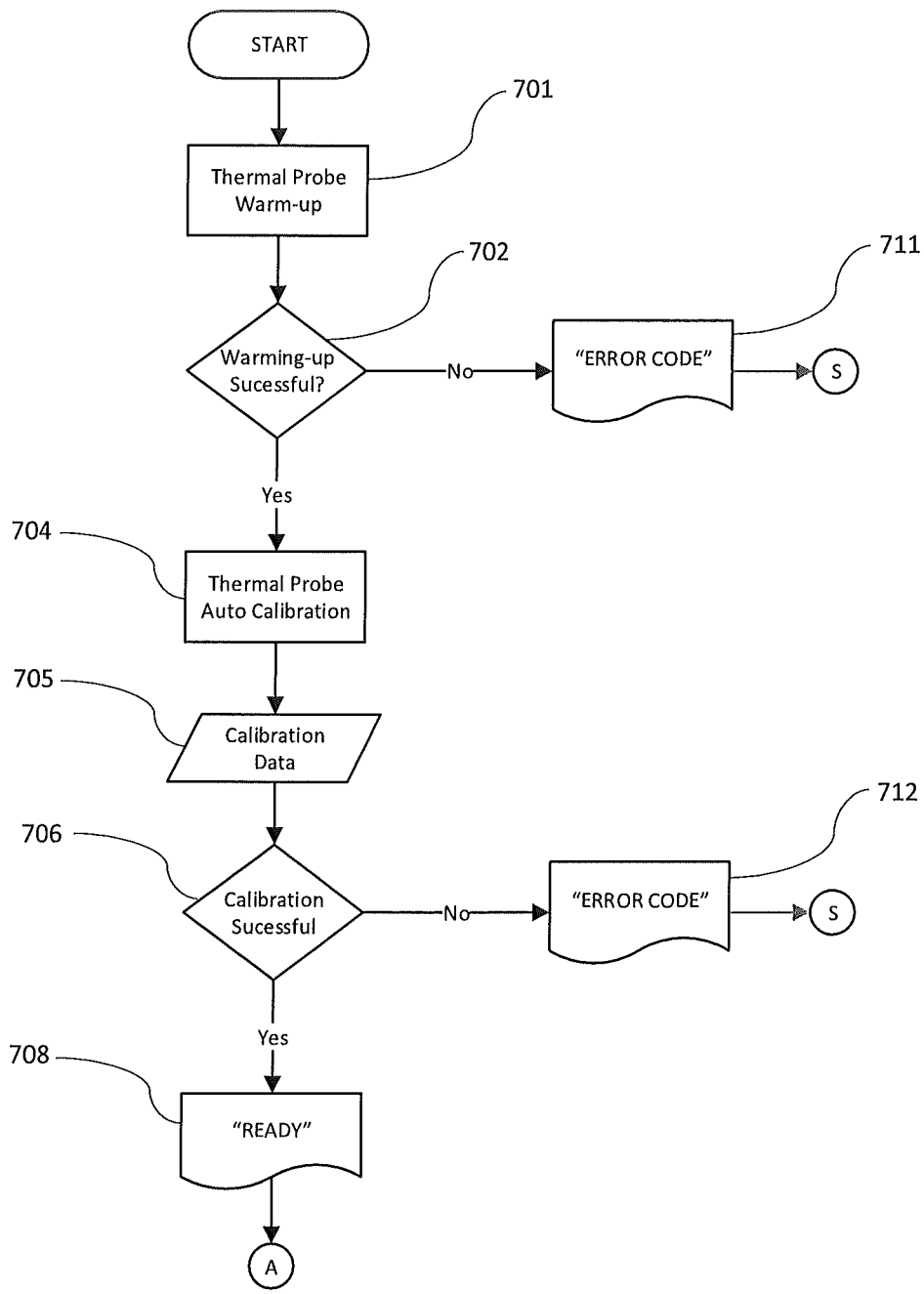
FIG. 9A-9C shows a flow diagram illustrating a mode of operation of the gemstone testing device.
Figure 9B:
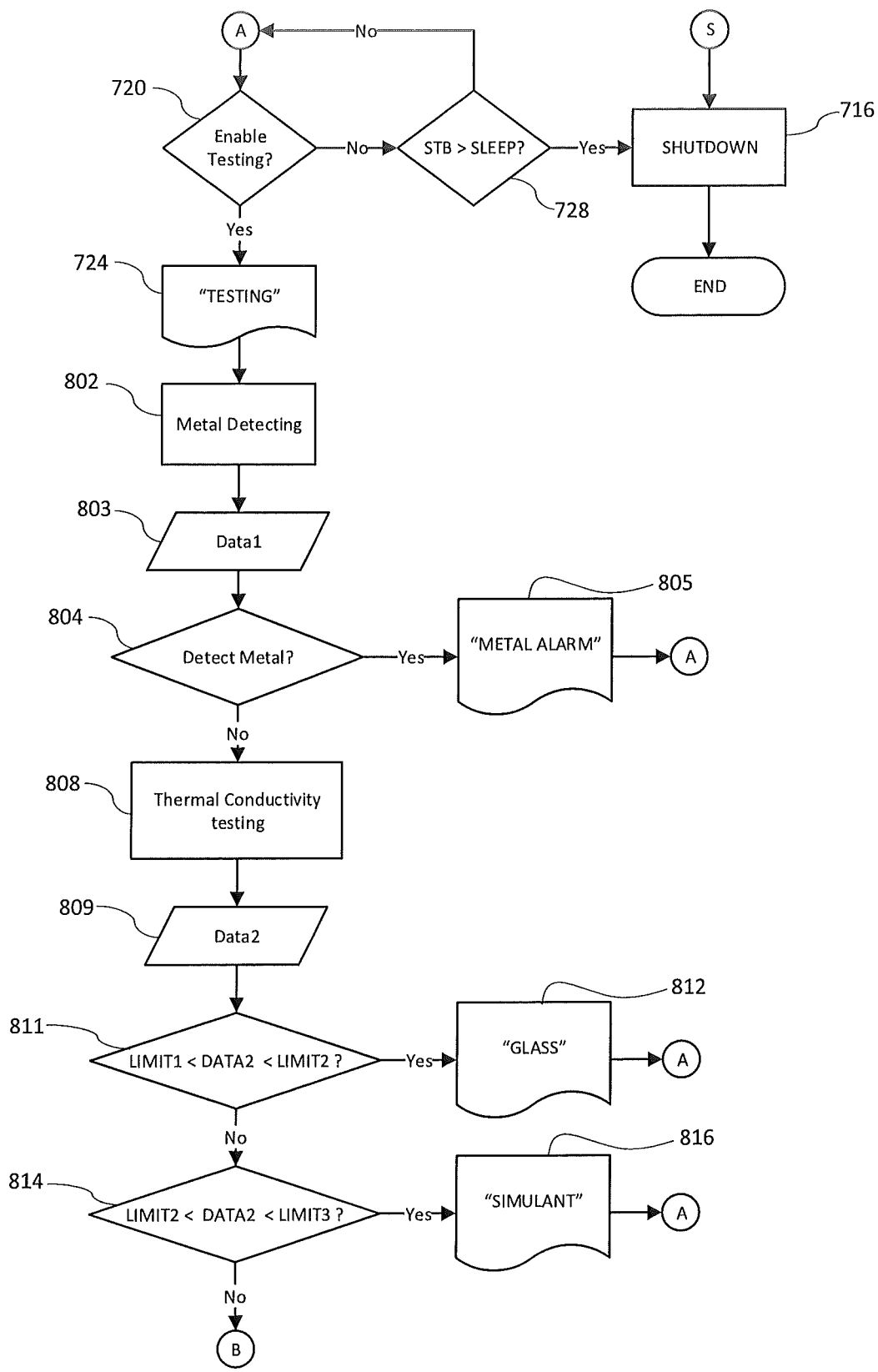
Figure 9C:
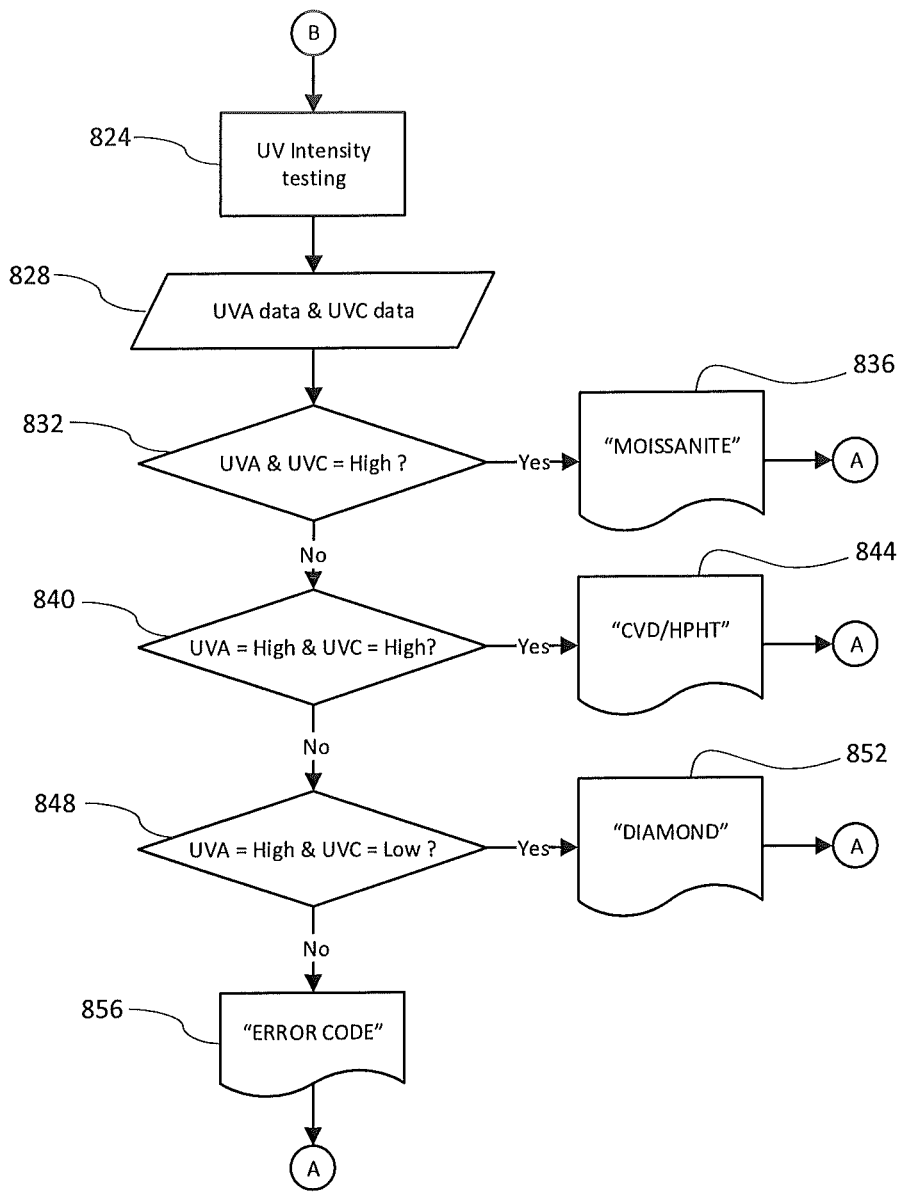

FIG. 9A to 9C are high-level flow charts showing the calibration, functioning and testing of the electronic circuitry of the testing apparatus. Once turned on and initialized, it will begin with Thermal probe warm-up process 701, if the warming-up is successful and passed 702 then proceed to Thermal probe auto calibration 704, the tester calibrates itself using stored calibration data 705. If the calibration is successful and passed 706 then a ready signal 708 is sent to be displayed and sounded with audio. If the calibration fails, then an error code is produced 711, 712. After failing calibration, the system may now shut down 716. Once a ready signal 708 has been sent, testing can be enabled 720. If testing is enabled 720 then a test sequence may begin and "testing" 724 may be displayed on the screen. If testing is not enabled, the system can enter standby mode or sleep mode 728. If standby or sleep mode 728 continues for a period of time, the system can be programmed to shut down 716.

In one embodiment, before testing of the stone begins, the system checks using electrical conductivity testing that the probe tip has not been placed in contact with metal 802. This might occur when testing a stone (which has a high thermal conductivity) in a metal jewelry setting. The common material used to hold a jewelry stone is metal which has a high electrical conductivity. To be able to detect whether the probe touches a metal or Natural Diamond or Synthetic Diamond, the metal is detected by the electrical conductivity test.

A simple thermal conductivity test cannot separate Diamond, Synthetic, Moissanite, CD/HPHT from metal because all of these materials have high thermal conductivity. To separate high thermal conductivity stones from metal using a simple method, a simple electrical conductivity test will do. Detecting if there is a closed loop circuit between these following parts and objects; internal metal detect circuit (inside apparatus), body conductive grip (part apparatus outside body), two hands of the user (use left and right to hold apparatus and stone holder), conductive stone holder (for mounted setting) or conductive stone tray (for loose settings), the object being touched by test probe (test object), and test probe. The internal metal detect circuit 27 has a pull-up resistor while the end of the test probe is connected to circuit ground, this makes a closed-loop circuit when the object touched by test probe is a conductive material like metal. The internal metal detect circuit 27 is also connected to MCU for detecting changes on output. If a low voltage amplitude (closed-loop circuit) is detected, metal is detected and an alarm will be triggered with visual and audio. If a high voltage amplitude (open-loop circuit) is detected, a non-metal has been detected and the process may proceed with further testing such as thermal conductivity and UV reflectivity tests.

The testing apparatus equipment for the electrical conductivity material test includes the hand grip 26 which is internally connected to the electronics circuit as well outwardly being contacted to the human hand. The apparatus checks metal by a closed loop conductivity test with the use of both hands. In the case of testing loose stones, the stone should be placed on the slot of the provided metal tray and the user will hold the apparatus at the conductive grip with one hand and the other hand on the stone tray. If the probe touches an electrically conductive material, a reading is taken and the data (data1, 803) is stored in temporary or permanent memory. If metal is detected 804, a metal alarm is sounded with audio and/or a screen indication such as "Metal Alarm" 805. After this alarm, the user can reposition the probe tip to move it away from metal (such as in a jewelry setting) and onto the stone mounted in the jewelry. By adjusting the location of the probe 5, the user can avoid the probe 5 touching metal.

In some embodiments, when testing of the stone begins, the first test is an electrical conductivity test 802, second a thermal conductivity test 808, then optical test or lighting test 824 is the next performed. The same probe and probe tip can be used for both the thermal conductivity 808 and optical light testing 824. Additionally, in some embodiments the electrical conductivity test is performed with the same probe tip.

In some embodiments, the thermal conductivity test process 808 is done by measuring the heat transfer from a thermal probe 5 to a gemstone. A small amount of voltage is being amplified by an amplifier circuit and then its output is measured by the Microcontroller unit 25. When the testing starts, the voltage output from the Operational amplifier circuit is increasing and the microcontroller unit 25 waits for the output to be stable before getting a final reading. The final reading will be compared to the threshold values to determine if the thermal conductivity is in the low, medium or high range. For example, the limits 1, 2, 3, 4 represent the voltage level. If the reading is low (between Limit 1 to 2 (811)) the result is Glass 812, medium (between Limit 2 to 3 (814)) value is Simulant 816 and for the high value (greater than limit 3 or between limit 3 and 4) the result is for Natural Diamond, Synthetic Diamond (CVD/HPHT) and Moissanite. Depending on which data matches or seems closest, the microcontroller unit 25 makes a determination as to the type of specimen under test (e.g., glass related data 811, simulant 814). Finally, if the value is low to medium, there is no need to proceed in Optical testing, while if the value is high, the next process is to check by Optical testing to separate the Natural Diamond from CVD/HPHT Diamond and Moissanite since all these stones cannot be separated by thermal conductivity testing alone.

In some embodiments, an impulse of thermal power is applied to the gemstone by contact with the flat surface or head and the resulting change in resistance of a temperature sensing resistor 19 is sensed. The thermal power or heat is supplied by a heating element, for example a heating resistor 18. The change in resistance is weighted by a sensed resistance to give an indication of change in temperature. In some embodiments, a sensor such as an NTC sensor 19 is used for heat sensing. Using thermal conductivity testing, based on the heat conductivity of the specimen being tested the microcontroller unit 25 determines whether the specimen is glass 812, or a simulant 816. Each of these has different thermal conductivity properties as described earlier. The microcontroller unit 25 receives data from the thermal sensor and compares it to data it accesses (for example in data unit #2, 809) regarding the thermal conductivity of different types of possible specimens (for example glass 812 and simulants 816 thermal conductivity related data). Depending on which data matches or seems closest, the microcontroller unit 25 makes a determination as to the type of specimen (e.g., glass related data 811, simulant 814). In some embodiment, the amount of heat conductivity sensed is measured by the heat sensor 19 attached to the copper tube of the probe. In some embodiment, the heat conductivity is measured based upon the amount of time it takes for the heating element to sense a cooling-off of a predetermined number of degrees (between two selected temperatures). Other methods of calculating the heat conductivity may be used. In some embodiments, if the heat conductivity sensed is between a limit 1 and a limit 2 (811) then the specimen is determined to be glass 812. If heat conductivity sensed is between limit 2 and limit 3 (814) then the specimen is determined to be a simulant 816. If the heat conductivity sensed is greater than limit 3 (814) then the programmed microcontroller unit 25 proceeds to light testing, e.g., ultraviolet (UV) light testing.

In some embodiments the thermal conductivity testing 808 is followed by optical intensity test 824. In some embodiments, an LED UV light 4 is used for the optical intensity testing 824. Light is emitted towards the specimen by fibers at the fiber bundle head 3 to strike the specimen, preferably on the table facet of the specimen 22. The light sensor or optical detector 15 will detect the light that is reflected back from the specimen into the fiber optic portion 11 of the testing probe 5. In some embodiments, photodiodes are utilized in the optical detector 15 to detect light energy and generate a flow of current in an external circuit which is amplified in DC by an amplifying circuit and then transmitted to the processing unit for analyzing and processing. A reading is taken of the intensity of light sensed 828 which may be stored in temporary or permanent memory by the Microcontroller unit.

As part of this light intensity testing process, long wave lights and short wave lights may be used. In one embodiment the longwave lights emitted by LED 4 source and radiated by the optical fiber ring 3 will be activated first. Once the photodiode 15 detects the longwave lights emitted by optical fiber ring 3, then the shortwave lights 4 will be activated. The sensor 15 will receive the short-wave lights, the programmed microcontroller unit 25 will automatic control the testing process as well the test result.

In one embodiment, in a UV intensity testing 824 process, a photodiode is utilized in the optical detector 15 to detect light energy and generate a flow of current in an external circuit which is amplified in DC by an amplifying circuit, its converts a variable input photocurrent in a form of analog light signals to a proportional voltage and then transmitted to the processing unit 25 for analyzing and processing. A reading is taken of the intensity of light sensed which is the voltage data (828) will fall into one of the 3 categories; Category 1 (832), UVA & UVC are LOW light intensity then the specimen is determined to be 836, Category 2 (840), UVA & UVC are HIGH light intensity then the specimen is determined to be a CVD/HPHT 844, Category 3 (840), UVA is HIGH but UVC is LOW light intensity then the specimen is determined to be a Diamond 852. However, if the results are outside from those conditions, then an error code is produced 856.

More specifically, when the testing has been activated, longwave and shortwave UV reflected intensity are measured by an optical detector 15 and its signal is being amplified by an operational amplifier circuit and then measuring its output by MCU 25. In one example, the longwave UV LED 4 turns ON for about 300 mS followed by the shortwave UV with the same turn ON time and being measured by an optical detector 15 during their individual ON state. The UV light absorbed by the colorless gemstone was assessed by an optical detector 15 that was configured in the photovoltaic mode in the pre-amplifier stage of the signal conditioner circuit shown FIG. 11 This configuration converts a variable input photocurrent in the form of analog light signals to a proportional voltage. A pre-amplifier with a low pass filter is used for this purpose.

Figure 10:
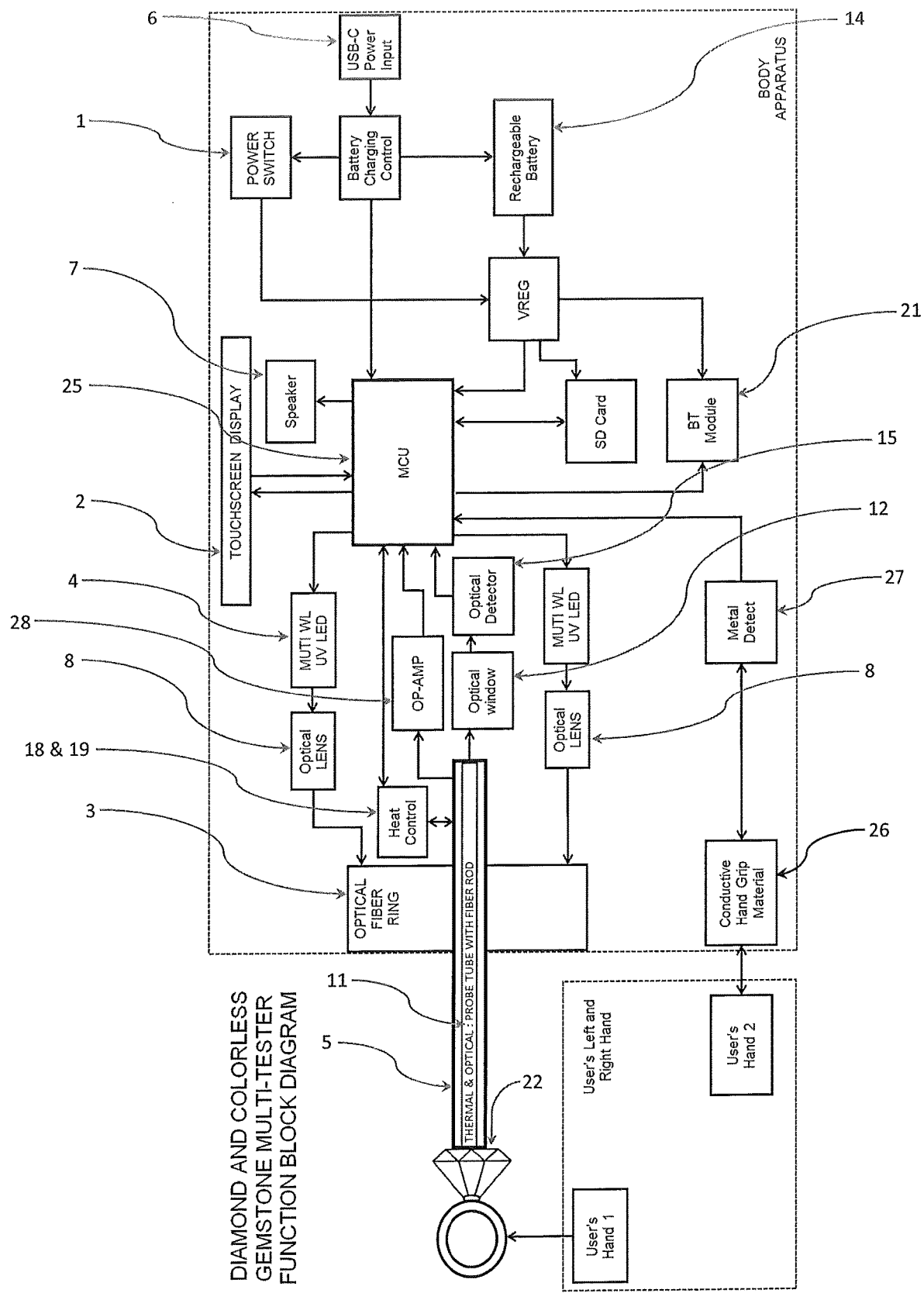
FIG. 10 shows an electronics block diagram of the gemstone testing device.

FIG. 10 is a function block diagram of one embodiment of the tester. It depicts a user holding a ring with a mounted stone in one hand and the handheld casing 10 by hold at the conductive hand grip area 26 in the other hand. The optical and thermal probe tube 5 is shown with its probe tip in direct contact with the stone's table facet 22.

In this embodiment, the following parts are shown in an operable configuration: a casing 10, a touch screen display 2, optical fiber bundle head 3 in the shape of a ring, multi-wave length UV LED 4, optical lens 8, optical & thermal copper tube 5, optical fiber rod 11, table facet of stone 22, optical window 12, optical detector 15, heat control 18 & 19, Conductive Hand Grip 26, Metal Detector 27, Operational Amplifier (OP-AMP) 28, Microcontroller unit 25, Bluetooth module 21, speaker 7, USB power input 6. The operation switch 1 and are shown operably connected to a battery control for rechargeable battery 14, and voltage regulator.

The power supply, be it by battery 14 or electrical input 6, once turned on from the power switch will activate the voltage regulator and micro controller unit. The user controls the device functions through a menu on the touch screen LCD module 2.

The touch screen display 2 is shown operably connected to the Microcontroller unit. The optical fiber ring 3 is shown operably connected to the optical lens 8 and multi wavelength UV LED 4. The thermal & optical copper tube 5 is shown operably connected to thermal equipment (heat control and thermal detector 18 & 19) and optical equipment (optical window 12 and optical detector 15). A USB-C power input 6 is shown operably connected to a battery 14. The speaker is shown operably connected to the Microcontroller unit 25. The multi wavelength UV LED 4 is operably connected to the Microcontroller unit 25.

The metal detection is also available to prevent inaccurate testing. Internal metal detect circuit 27 (inside apparatus), body conductive grip 26 (part apparatus outside body), two hands of the user (use left and right to hold apparatus and stone holder), conductive stone holder (for mounted setting) or conductive stone tray (for loose settings), the object being touched by test probe (test object), and test probe 5. The internal metal detect circuit 27 has a pull-up resistor while the end of the test probe is connected to circuit ground, this makes a closed-loop circuit when the object touched by test probe 5 is a conductive material like metal. The internal metal detect circuit is also connected to MCU 25 for detecting changes on output. If detected low voltage amplitude (closed-loop circuit), metal is detected and will alarm with audio 7 and show to the display 2.

The functional testing apparatus comprises a speaker 7, a display which is touch screen color LCD 2, wherein the Speaker 7 and the display 2 are operatively linked to the microcontroller unit 25. Accordingly, once the test result is generated, a test result signal is generated by the microcontroller 25 and sent to the Speaker 7, and the LCD 2 will display the characters/names such as "DIAMOND", "CVD/HPHT", "MOISSANITE," "SIMULANT" and "GLASS" in response to the test result signal sent from the microcontroller unit 25. The microcontroller unit 25 further comprises a Bluetooth communication unit 21 operatively linked to the transmission unit to transmit the test result to the functional unit and at the same time to transmit the test result to an external electronic device, such as smart phone or tablet. The communication unit 21 transmits the test result to the electronic device through a wireless communication network, such as Bluetooth.

The Bluetooth communication module 21 is operably connected to the Microcontroller unit 25 which controls most functions of the tester.

From FIG. 10 the flow of an example of an operation sequence of the gemstone testing device can be explained. Once the switch 1 is powered ON, the device, using the processing unit 25, will self-calibrate through a software program. If the tester is able to be properly calibrated, "PASS" will display on the menu functions on the LCD 2. Following the display of "PASS," "Main Test" will be displayed on the LCD touch screen 2 which can be selected to be activated by a user's touch on the LCD touch screen 2. The sequence and flow of events of FIGS. 9A, 9B and 9C follow.

Figure 11:
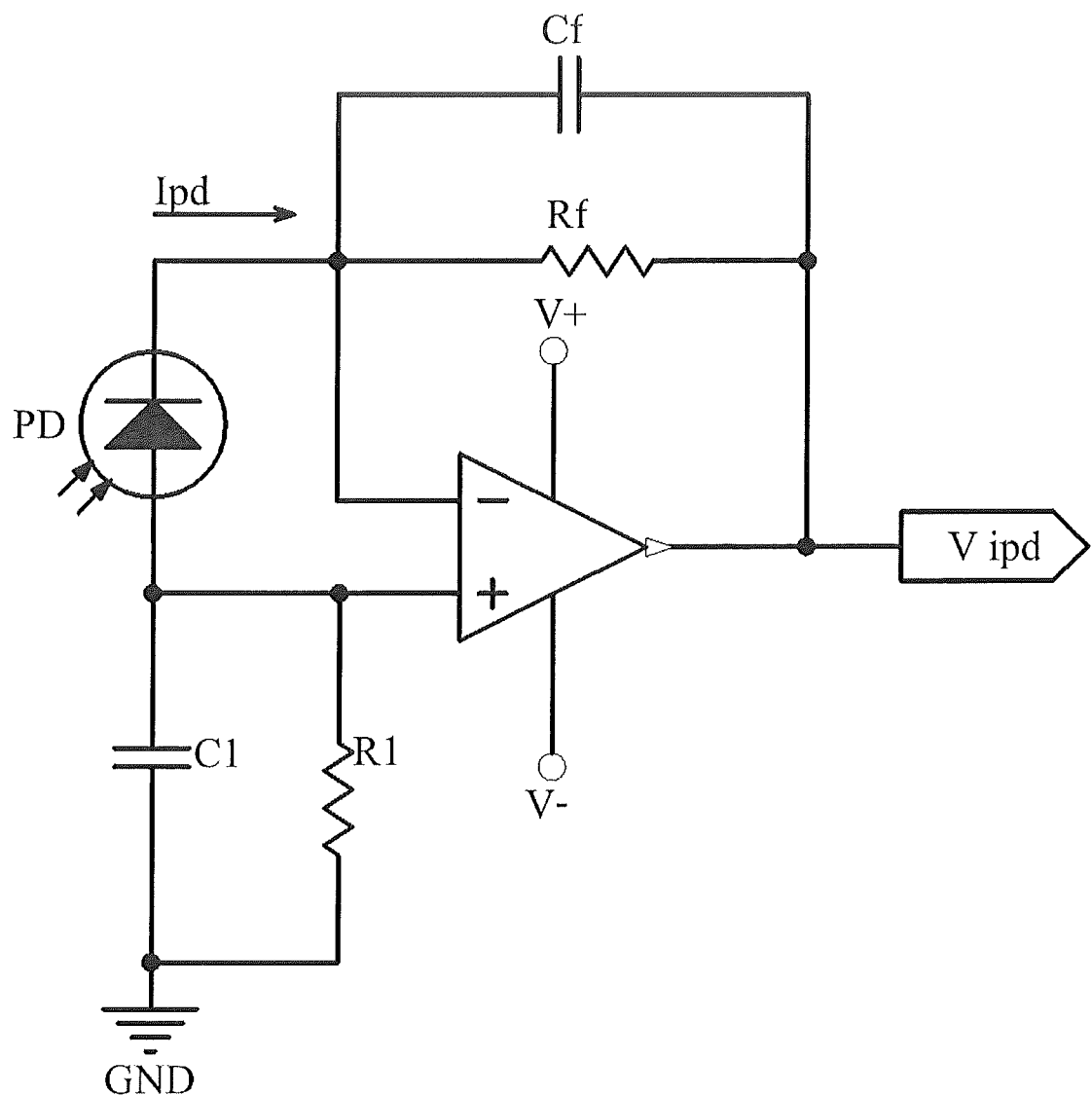
FIG. 11 shows the preamplifier with low pass filter.

FIG. 11 is a pre-amplifier with a low pass filter. The relationship between the two variables; voltage photocurrent (Vipd) and photocurrent (Ipd) is given by the equation below $$Vipd=Ipd(Rf+R1);$$

where Vipd is the voltage corresponding to the photocurrent, where Ipd is the photocurrent, Rf is a feedback resistor and R1 is a resistor tied to the anode of the photodiode.

Figure 12:
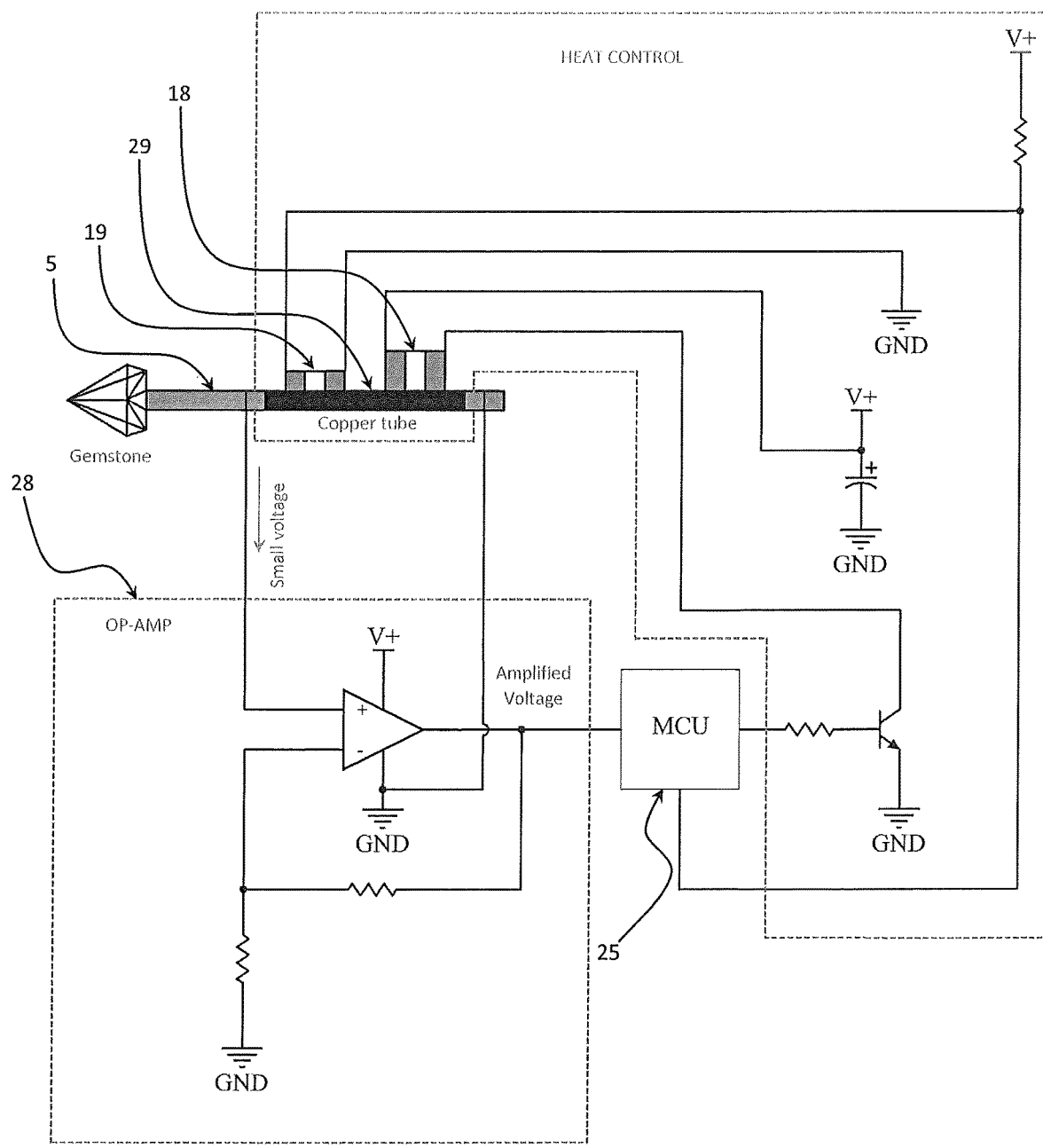
FIG. 12 shows a simplified drawing and connections of the copper sensor parts and amplifier circuit with the microcontroller unit (MCU).

FIG. 12 is a simplified drawing relating to the thermal conductivity testing showing connections of the copper sensor parts and the operational amplifier circuit going to the Microcontroller Unit 25. Thermal conductivity testing is accomplished by measuring the heat transfer from the thermal probe to a gemstone. A small amount of voltage is being amplified by an amplifier circuit and its output measured by the microcontroller unit 25. When the thermal conductivity testing starts, the voltage output from the operational amplifier circuit is increasing and the microcontroller unit 25 waits for the output to be stable before getting its final reading. The Heat Control Block is composed of the Heater Resistor 18 which is responsible for heating and the NTC Thermistor 19's pull-up resistor. The Microcontroller unit 25 controls the base pin of a transistor in which its emitter pin is connected to circuit ground and the collector pin is connected to the Heater Resistor 18 and its other side is connected to 3.3V power supply. The temperature of the tube 5 is monitored by the NTC Thermistor 19 which is attached to it. NTC Thermistor 19 is connected to Heat Control Circuit and monitored by Microcontroller Unit 25. Microcontroller Unit 25 controls the heater resistor 18 by changing the duty cycle of PWM's (Pulse Width Modulation) input depending on the Thermistor's voltage to maintain the desired temperature for testing. The copper probe 5 should be in contact with the stone from the start of the testing until having the result. In thermal testing, MCU 25 waits for a stable reading (roughly for example for 2-3 seconds) and obtains the highest stable data for comparing with the stones threshold values which are set by Microcontroller Unit program.

In an embodiment, there is an apparatus for testing and distinguishing a precious stone specimen such as Earth-mined diamonds, Chemical vapor deposition/High Pressure High Temperature Diamonds (Type IIa), Simulant and Moissanite, based on their thermal and optical properties, comprises:

a hand-held casing, a test probe which is 2-in-1 thermal and optical LED probe tip comprising a copper tube with attached thermal sensor, and a testing set-up which is done by only one test probe and a single test, and wherein the copper tube is contacting a table facet of the target precious tone, and the copper tube has an attached heating element, and a thermistor with connecting wires that sense thermal conductivity of a precious stone, and wherein the copper tube also comprises of at least one optical fiber inside the tube for receiving light and transmitting to the optical sensor, a bundle of fiber surrounds the copper tube and are split to the light source, at least one or more optical detectors, an optical window assembled between a copper tube and an optical detector, an optical lens assembled between a fiber bundle and light source for light focusing, an optical window which is setup between a receiving sensor and vertically with the copper probe, the UV LEDs comprise of short and long wavelength which are located in a housing, and the UV LEDs light travels to optical fiber bundle for illuminate a precious stone under test, a display unit with touch panel for showing the device functions, indicate the test result and receive the command from the user, a speaker with multi-language output, a Bluetooth communication for connecting to an application in smartphone, tablet, or other device.

In another embodiment, the precious stone multi-tester apparatus includes
the design of an elongated handheld body having a test probe disposed extending from the body distal end, the front end of the test probe will be in contact to the table facet of the polished stone and the back end will be in contact to the optical detector unit,
a test probe which is copper tube comprising a heating element, a thermistor with connecting wires, and having at least one optical fiber inside the copper tube leading to the housing of an optical detector unit inside the body, wherein an optical window is placed between the copper tube end and the detector.
a copper tube proximal end surrounded by a bundle of hollow cylindrical fiber ring light paralleled in longitudinal axis next to the probe end which is not exposed outer body distal end, wherein
a ring light front end surface paralleled to a copper tube front end, and comprising at least one optical fiber which at the back end leads to the optical lens or to the light source or both and they are set aside in a concentric line to each other.

In another embodiment, the multi-tester includes an electrical conductivity tester. In some embodiments, the electrical conductivity tester tests for metal to determine whether the probe is in contact with metal such as metal jewelry or a metal holder.

In another embodiment the precious stone multi-tester apparatus includes an optical detector which is Si—C photodiode with extended wavelength for optical measurement in UV-range, it is located to receive light from the end of test probe, wherein an optical detector is placed in the housing which has optical window at the front end, and the back end of copper tube with inner optical fiber in the tube placed perpendicularly of the other side of the optical window.

In another embodiment, the precious stone multi-tester apparatus wherein the light unit includes at least two wavelengths in one SMD package which are UVC for emitting the short wavelength light between 250 nm to 275 nm and UVA which emits the long wavelength light between 350 nm to 375 nm, wherein an optical lens is between the light unit and the fiber bundle back end, in order to improve signal coupling between fibers and emitters.

In another embodiment, the precious stone multi-tester includes a unique design for a fiber bundle having a hollow cylindrical head, the fibers are arranged in inner circle circumference and branching towards the light source unit where in an optical lens is used to couple with LEDs.

In another embodiment, the precious stone multi-tester apparatus according to one or more of the above claims, wherein a TFT Liquid Crystal Display with touchscreen panel is used giving output result as well as making it easy to be operate by novice user, and a speaker that can output in multiple languages, and a Bluetooth communication module for connect to applications in smartphones or tablets.

In another embodiment, the precious stone multi-tester apparatus wherein the precious stone is the polished colorless-near colorless: earth-mined diamond, Type IIA-HPHT/CVD diamond, Simulant and Moissanite (including F1 Moissanite), and metal detection is also available to prevent inaccurate testing.

In another embodiment, a method of distinguish a precious stone, wherein the testing and the distinguishing of a precious stone is performed using thermal conductivity and optical intensity testing where in the microcontroller unit and the software are adapted to determine the gemstone category.

In another embodiment, the precious stone multi-tester apparatus, wherein in the method of distinguish a precious stone, Thermal conductivity of Glass/CZ is the lowest and then Simulant is next which the test will be done but if those high thermal conductivity starting from Moissanite, CVD/HPHT and Natural diamond, the Optical testing will be apply by detecting the lights intensity where reflected from angle edge inner the precious stone depends on the absorbance response in the precious stone; for the Natural Diamond its will be absorb the short-wave ultraviolet light but not absorb the long-wave ultraviolet light, thus only long-wave UV lights will reflect back; the CVD/HPHT will not absorb the both short and long wave UV light, thus its will reflect back both; the Moissanite will absorb both short and long wave UV light thus it will not reflect back the light.

In another embodiment, the testing apparatuses described above are configured to perform the following method: testing and the distinguishing a precious stone using thermal conductivity and the optical intensity testing where in the microcontroller unit and the software are adapted to determine the gemstone category.

In another embodiment, the testing apparatuses described above are adapted to distinguish a precious stone wherein the method includes: recognizing that the thermal conductivity of Glass/CZ is the lowest and then the thermal conductivity of Simulant is the next lowest, these will be determined with thermal conductivity testing; however, if thermal conductivity is higher than those two, the higher thermal conductivity requires further testing to detect and distinguish between Moissanite, CVD/HPHT and Natural diamond; next step is optical testing; the optical testing will detect the lights intensity when reflected from angle edges inside the precious stone which depends on the absorbance response in the precious stone; the Natural Diamond will absorb the short-wave ultraviolet light but reflect and transmit the long-wave ultraviolet light, thus most light reflected back is the long-wave UV light; the CVD/HPHT will reflect and transmit both short and long wave UV light, thus its will reflect back both short and long wave UV light; the Moissanite will absorb both short and long wave UV light, thus it will not reflect back the light as well as the other stones. With optical testing, the difference in short and long wave UV light absorption and reflection by Natural Diamonds, CVD/HPT and Moissanite allows the Microcontroller unit in the tester to distinguish among the three types of stones.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practice. Thus, the scope of the embodiments should be determined by the claims and their equivalents, rather than by the examples given.

The embodiments of the present specification can also be described with the following lists of elements being organized into items. The respective combinations of features which are disclosed in the item list are regarded as independent subject matter, respectively, that can also be combined with other features of the present specification.

The invention claimed is:

1. An apparatus for testing and identifying precious stones and man-made stones based on their thermal and optical properties, the apparatus comprising:
- a handheld case;
- a probe connected to the handheld case comprising an outer metal tube and at least one optical fiber positioned within the metal tube, wherein a tip of the probe makes contact with a table facet of a stone under test and the at least one optical fiber receives light reflected from the stone under test;
- a heating element, wherein the metal tube is heated by the heating element;
- a thermistor operably connected to the metal tube, wherein the temperature of the metal tube is sensed;
- an ultraviolet LED source producing short and long wavelength UV light;
- an optical fiber bundle, optically connected to the LED source and surrounding at least a portion of the metal tube, wherein the optical fiber bundle illuminates the stone under test with the short and long wavelength UV light;
- an optical detector, connected to the at least one optical fiber, wherein the received light of the at least one optical fiber is measured;
- a microcontroller, operably connected to the thermistor and optical detector, configured to determine optical properties and thermal properties of the stone under test, wherein the microcontroller is configured to determine the thermal properties of the stone under test prior to determining the optical properties, and to activate the ultraviolet LED source to illuminate the stone under test only if the determined thermal properties indicate a thermal conductivity above a predetermined threshold corresponding to materials other than glass or simulants; and
- a display unit, attached to the handheld case, wherein results of the stone under test are displayed,
- two wires connected to the metal tube, wherein one wire is connected to the metal tube near the heating element, and another wire is connected to the metal tube near the thermistor,
- wherein voltage difference between the two wires is measured and amplified using an operational amplifier circuit, and
- wherein an output of the operational amplifier circuit is measured by the microcontroller to determine level of heat transfer from the metal tube to the stone.

2. The apparatus of claim 1 wherein the optical fiber bundle surrounds the metal tube towards the tip of the probe and emits light toward the stone under test.

3. The apparatus of claim 2 wherein the optical fiber bundle and the metal tube are encased in a housing, wherein the optical fiber bundle is optically connected to the LED source, wherein a ball lens is placed between the optical fiber bundle and the LED source, and wherein the ball lens allows light to travel between the LED source and the optical fibers with minimal losses.

4. The apparatus of claim 1 wherein the microcontroller is configured to identify the stone under test wherein the stone under test is one of an earth-mined diamond, HPHT diamond, a CVD diamond, a Simulant, a Moissanite, and a Cubic Zirconia CZ.

5. The apparatus of claim 1 wherein the apparatus is further configured to test for metal using a conductive hand grip and the probe, wherein the apparatus examines for a closed electrical circuit to indicate electrical conductivity of the item under test.

6. The apparatus of claim 1 further comprising an optical window between the at least one optical fiber and the optical detector.

7. The apparatus of claim 1 wherein the display unit includes a touch screen display panel.

8. The apparatus of claim 1 further comprising a speaker for audio output of information.

9. The apparatus of claim 8 wherein the apparatus is configured for selecting a language for audio output on the speaker.

10. The apparatus of claim 1 wherein in the display unit further comprises software for selecting a display screen language from several languages.

11. The apparatus of claim 1 wherein the optical detector is an Si-C photodiode with extended wavelength for optical measurements in the ultraviolet range.

12. The apparatus of claim 1 wherein the LED source comprises an SMD package which emits ultra-violet short wavelength between 250 nm and 275 nm and ultra-violet long wavelength between 350 nm and 375 nm.

13. The apparatus of claim 1 further comprising a Bluetooth transceiver wherein the apparatus is adapted to communicate with a smartphone or a tablet via Bluetooth.

14. The apparatus of claim 1 wherein the metal tube comprises a copper tube.

15. An apparatus for testing and identifying precious stones and man-made stones based on their thermal and optical properties, the apparatus comprising:
- a handheld case;
- a probe connected to the handheld case comprising an outer metal tube and at least one optical fiber positioned within the metal tube, wherein a tip of the probe makes contact with a table facet of a stone under test and the at least one optical fiber receives light reflected from the stone under test;
- a heating element, wherein the metal tube is heated by the heating element;
- a thermistor operably connected to the metal tube, wherein the temperature of the metal tube is sensed;
- an ultraviolet LED source producing short and long wavelength UV light;
- an optical fiber bundle, optically connected to the LED source and surrounding at least a portion of the metal tube, wherein the optical fiber bundle illuminates the stone under test with the short and long wavelength UV light;
- an optical detector, connected to the at least one optical fiber, wherein the received light of the at least one optical fiber is measured;
- a microcontroller, operably connected to the thermistor and optical detector, configured to determine optical properties and thermal properties of the stone under test, wherein the microcontroller is configured to determine the thermal properties of the stone under test prior to determining the optical properties, and to activate the ultraviolet LED source to illuminate the stone under test only if the determined thermal properties indicate a thermal conductivity above a predetermined threshold corresponding to materials other than glass or simulants; and
- a display unit, attached to the handheld case, wherein results of the stone under test are displayed,
- two wires soldered to the metal tube for use in the thermal conductivity testing, wherein one wire is connected to the metal tube near the heating element, and another wire is connected to the metal tube near the thermistor, wherein voltage difference between the two wires is measured and amplified using an operational amplifier circuit, and wherein an output of the operational amplifier circuit is measured by the microcontroller to determine level of heat transfer from the metal tube to the stone.

16. The apparatus of claim 15 wherein the metal tube comprises a copper tube.

17. A method for testing and identifying precious stones and man-made stones based on their thermal and optical properties using a handheld testing apparatus, the method comprising:

heating a metal tube with a heater wherein the heater is connected to the metal tube;

sensing the temperature of the metal tube using a thermistor;

placing the heated metal tube in contact with a stone under test;

calculating, using a microcontroller, the amount of heat transfer from the metal tube to the stone under test;

determining whether the calculated heat transfer is within certain ranges expected of glass, a simulant, or item of greater thermal conductivity, wherein the greater the heat transfer the higher the thermal conductivity of the stone under test;

wherein the microcontroller is configured to determine the thermal properties of the stone under test prior to determining the optical properties, and to activate ultra-violet LED lights to illuminate the stone under test only if the determined thermal properties indicate the thermal conductivity above a predetermined threshold corresponding to materials other than the glass or the simulants;

turn ultraviolet LED lights on;

passing the ultraviolet LED light through an optical fiber bundle;

illuminating the stone under test with ultra-violet light using the optical fiber bundle, wherein the stone under test reflects some portion of the ultra-violet light;

receiving ultra-violet light reflected by the stone under test using an optical fiber located inside the metal tube, wherein the optical fiber is in contact with the stone under test;

measuring the amount of ultra-violet light reflected into the optical fiber using an optical detector;

determining, using a microcontroller, based on the amount of ultra-violet light reflected, whether the stone under test is in optical property range of a Moissanite, Chemical Vapour Deposition (CVD)/High Pressure High Temperature (HPHT) or diamond; and displaying a result of the determining step on type of stone on a visual display, connecting two wires to the metal tube, wherein one wire is connected to the metal tube near the heating element, and another wire is connected to the metal tube near the thermistor, measuring voltage difference between the two wires;

amplifying the voltage difference using an operational amplifier circuit, and measuring, with the microcontroller, an output of the operational amplifier circuit to determine level of heat transfer from the metal tube to the stone.

18. The method of claim 17 wherein the ultra-violet light is both short and long wavelength ultra-violet light and wherein the short and the long wavelength are each separately measured.

19. The method of claim 17 wherein the handheld apparatus includes a hand grip that conducts electricity, the method further comprising the step of electrical conductivity testing using the metal tube wherein it is determined whether there is metal in contact with the metal tube.

20. The method of claim 17 wherein the metal tube comprises a copper tube.

* * * * *